US009417758B2

(12) United States Patent
Tsai

(10) Patent No.: US 9,417,758 B2
(45) Date of Patent: Aug. 16, 2016

(54) AD-HOC WEB CONTENT PLAYER

(76) Inventor: Daniel E. Tsai, Atkinson, NH (US)

( * ) Notice: Subject to any disclaimer, the term of this patent is extended or adjusted under 35 U.S.C. 154(b) by 1328 days.

(21) Appl. No.: 11/942,876

(22) Filed: Nov. 20, 2007

(65) Prior Publication Data
US 2008/0141132 A1 Jun. 12, 2008

Related U.S. Application Data

(60) Provisional application No. 60/866,635, filed on Nov. 21, 2006.

(51) Int. Cl.
G06F 3/048 (2013.01)
G06F 3/0481 (2013.01)
G06Q 30/02 (2012.01)
G06F 17/30 (2006.01)

(52) U.S. Cl.
CPC ........ *G06F 3/0481* (2013.01); *G06F 17/30905* (2013.01); *G06Q 30/0275* (2013.01)

(58) Field of Classification Search
CPC ... G06F 9/4446; G06F 3/0481; G06F 3/1454; G06F 8/65; G01C 21/367; H04N 5/44543; H04N 21/4622; H04N 21/47; G11B 27/34; G11B 27/034
USPC ................................................ 715/714, 716
See application file for complete search history.

(56) References Cited

U.S. PATENT DOCUMENTS

| | | | |
|---|---|---|---|
| 5,717,468 A * | 2/1998 | Baryla | 725/37 |
| 5,752,160 A * | 5/1998 | Dunn | 725/93 |
| 5,835,088 A * | 11/1998 | Jaaskelainen, Jr. | 715/803 |
| 5,861,906 A * | 1/1999 | Dunn et al. | 725/87 |
| 5,953,005 A * | 9/1999 | Liu | 715/243 |
| 5,969,283 A | 10/1999 | Looney et al. | |
| 6,177,931 B1 * | 1/2001 | Alexander et al. | 725/52 |
| 6,199,076 B1 | 3/2001 | Logan et al. | |
| 6,398,245 B1 * | 6/2002 | Gruse et al. | 280/228 |
| 6,515,656 B1 * | 2/2003 | Wittenburg et al. | 345/418 |
| 6,543,582 B2 * | 4/2003 | DiFranza et al. | 187/391 |
| 6,587,127 B1 * | 7/2003 | Leeke | G06Q 20/123 715/733 |
| 6,735,628 B2 * | 5/2004 | Eyal | G06F 17/30038 707/E17.009 |
| 6,799,327 B1 * | 9/2004 | Reynolds et al. | 725/42 |
| 6,933,433 B1 * | 8/2005 | Porteus et al. | 84/615 |
| 7,028,252 B1 * | 4/2006 | Baru et al. | 715/273 |
| 7,143,102 B2 * | 11/2006 | Fiennes et al. | 707/621 |
| 7,149,961 B2 * | 12/2006 | Harville et al. | 715/202 |
| 7,487,112 B2 * | 2/2009 | Barnes, Jr. | 705/26.8 |

(Continued)

OTHER PUBLICATIONS

RSS definition from Wikipedia (http://web.archive.org/web/20061018035125/http://en.wikipedia.org/wiki/RSS_%28file_format%29, dated Oct. 18, 2006, and last accessed Sep. 26, 2012.*

(Continued)

*Primary Examiner* — Jung-Mu Chuang
(74) *Attorney, Agent, or Firm* — Fish & Richardson P.C.

(57) ABSTRACT

A system for dynamically playing information using conventional feeds and ad-hoc feeds to produce "playable" content includes a device that executes a player engine, the player engine collecting, combining and sequencing items to play based on selection criteria and device context, of text, image, video content by parsing selective tags, patterns, text, identifiers and resource types of interest on resources such as web pages to produce playable content, storing the playable contents results from parsing in a queue of playable feed items, selecting items from the queue to produce an ad-hoc feed and playing the ad-hoc feed.

24 Claims, 24 Drawing Sheets

(56) References Cited

U.S. PATENT DOCUMENTS

| | | | | |
|---|---|---|---|---|
| 7,516,213 B2* | 4/2009 | Cunningham et al. | | 709/224 |
| 7,523,156 B2* | 4/2009 | Giacalone, Jr. | | 709/201 |
| 7,526,573 B2* | 4/2009 | Busey | | 709/246 |
| 7,610,394 B2* | 10/2009 | Katinsky et al. | | 709/231 |
| 7,647,351 B2* | 1/2010 | Monsarrat | | 715/235 |
| 7,660,581 B2* | 2/2010 | Ramer et al. | | 455/432.3 |
| 7,669,123 B2* | 2/2010 | Zuckerberg et al. | | 715/273 |
| 7,673,017 B2* | 3/2010 | Kim et al. | | 709/218 |
| 7,680,824 B2* | 3/2010 | Plastina et al. | | 707/737 |
| 7,680,882 B2* | 3/2010 | Tiu et al. | | 709/203 |
| 7,707,231 B2* | 4/2010 | LaChapelle et al. | | 707/804 |
| 7,730,216 B1* | 6/2010 | Issa et al. | | 709/250 |
| 7,757,182 B2* | 7/2010 | Elliott et al. | | 715/779 |
| 7,770,229 B2* | 8/2010 | Upendran | | 726/30 |
| 7,774,799 B1 | 8/2010 | Sellers et al. | | |
| 7,778,980 B2* | 8/2010 | Bodin et al. | | 707/693 |
| 7,788,586 B2 | 8/2010 | Brownell | | |
| 7,818,659 B2* | 10/2010 | Kahn et al. | | 715/203 |
| 7,840,527 B2* | 11/2010 | Kahn et al. | | 707/608 |
| 7,844,215 B2* | 11/2010 | Vance et al. | | 455/3.06 |
| 7,865,511 B2* | 1/2011 | Kahn et al. | | 707/758 |
| 7,908,183 B2* | 3/2011 | Jacobi et al. | | 705/26.7 |
| 7,917,439 B2* | 3/2011 | Barnes, Jr. | | 705/51 |
| 7,979,803 B2* | 7/2011 | Kim et al. | | 715/762 |
| 8,028,247 B2* | 9/2011 | Haynes | | 715/802 |
| 8,046,428 B2* | 10/2011 | Moyer et al. | | 709/217 |
| 8,060,830 B2* | 11/2011 | Kahn et al. | | 715/760 |
| 8,180,770 B2* | 5/2012 | Ranasinghe et al. | | 707/732 |
| 8,181,110 B2* | 5/2012 | Worthington | | 715/716 |
| 8,200,775 B2* | 6/2012 | Moore | | 709/217 |
| 8,218,764 B1* | 7/2012 | Kline | | 380/215 |
| 8,285,595 B2 | 10/2012 | Svendsen | | |
| 8,332,478 B2* | 12/2012 | Levy et al. | | 709/217 |
| 8,412,763 B2 | 4/2013 | Jones et al. | | |
| 8,516,035 B2 | 8/2013 | Neumann et al. | | |
| 8,549,097 B2* | 10/2013 | Katinsky et al. | | 709/217 |
| 8,549,410 B2 | 10/2013 | Hoyle | | |
| 8,549,411 B2 | 10/2013 | Hoyle | | |
| 8,566,462 B2* | 10/2013 | Jun et al. | | 709/229 |
| 8,606,845 B2* | 12/2013 | Dickinson et al. | | 709/203 |
| 8,621,531 B2 | 12/2013 | Casey et al. | | |
| 8,631,029 B1* | 1/2014 | Amacker | G06F 17/30554 | 707/766 |
| 9,015,590 B2* | 4/2015 | Kao et al. | | 715/719 |
| 2001/0018858 A1* | 9/2001 | Dwek | | 84/609 |
| 2002/0010623 A1* | 1/2002 | McCollom et al. | | 705/14 |
| 2002/0036655 A1* | 3/2002 | Yulevich et al. | | 345/744 |
| 2002/0059166 A1* | 5/2002 | Wang et al. | | 707/1 |
| 2002/0073179 A1 | 6/2002 | Mackintosh et al. | | |
| 2002/0078144 A1* | 6/2002 | Lamkin et al. | | 709/203 |
| 2002/0078456 A1* | 6/2002 | Hudson | G06F 17/30017 | 725/60 |
| 2002/0112925 A1* | 8/2002 | DiFranza et al. | | 187/391 |
| 2002/0138348 A1* | 9/2002 | Narayan et al. | | 705/14 |
| 2002/0169662 A1* | 11/2002 | Claiborne | | 705/14 |
| 2003/0018799 A1* | 1/2003 | Eyal | G06F 17/30864 | 709/231 |
| 2003/0020671 A1* | 1/2003 | Santoro | G06F 3/0481 | 345/1.3 |
| 2003/0033420 A1* | 2/2003 | Eyal | G06F 17/30038 | 709/231 |
| 2003/0041110 A1 | 2/2003 | Wenocur et al. | | |
| 2003/0065805 A1* | 4/2003 | Barnes, Jr. | | 709/231 |
| 2003/0093790 A1* | 5/2003 | Logan et al. | | 725/38 |
| 2003/0132953 A1* | 7/2003 | Johnson et al. | | 345/716 |
| 2003/0137531 A1* | 7/2003 | Katinsky et al. | | 345/716 |
| 2004/0001106 A1 | 1/2004 | Deutscher et al. | | |
| 2004/0015398 A1 | 1/2004 | Hayward | | |
| 2004/0030598 A1* | 2/2004 | Boal | | 705/14 |
| 2004/0078383 A1* | 4/2004 | Mercer | | G11B 19/025 |
| 2004/0158555 A1* | 8/2004 | Seedman et al. | | 707/3 |
| 2004/0268261 A1* | 12/2004 | Elliott et al. | | 715/716 |
| 2005/0015807 A1* | 1/2005 | Young | H04N 7/17318 | 725/86 |
| 2005/0080878 A1* | 4/2005 | Cunningham et al. | | 709/219 |
| 2005/0091219 A1* | 4/2005 | Karachale | | G06F 9/542 |
| 2005/0113172 A1* | 5/2005 | Gong | | 463/42 |
| 2005/0165615 A1* | 7/2005 | Minar | | 705/1 |
| 2005/0183017 A1* | 8/2005 | Cain | | 715/719 |
| 2005/0193010 A1* | 9/2005 | DeShan et al. | | 707/104.1 |
| 2005/0262533 A1* | 11/2005 | Hart et al. | | 725/40 |
| 2005/0267973 A1* | 12/2005 | Carlson et al. | | 709/228 |
| 2005/0289468 A1* | 12/2005 | Kahn et al. | | 715/738 |
| 2006/0015524 A1* | 1/2006 | Gardiner et al. | | 707/102 |
| 2006/0026067 A1* | 2/2006 | Nicholas et al. | | 705/14 |
| 2006/0069797 A1 | 3/2006 | Abdo et al. | | |
| 2006/0074753 A1* | 4/2006 | Schuh et al. | | 705/14 |
| 2006/0085259 A1* | 4/2006 | Nicholas et al. | | 705/14 |
| 2006/0129916 A1* | 6/2006 | Volk et al. | | 715/513 |
| 2006/0143236 A1* | 6/2006 | Wu | | 707/104.1 |
| 2006/0153040 A1* | 7/2006 | Girish | G06F 1/1616 | 369/59.21 |
| 2006/0161845 A1* | 7/2006 | Kahn et al. | | 715/700 |
| 2006/0167860 A1* | 7/2006 | Eliashberg et al. | | 707/3 |
| 2006/0173974 A1* | 8/2006 | Tang | | 709/217 |
| 2006/0173985 A1* | 8/2006 | Moore | | 709/223 |
| 2006/0184617 A1* | 8/2006 | Nicholas et al. | | 709/203 |
| 2006/0190616 A1* | 8/2006 | Mayerhofer et al. | | 709/231 |
| 2006/0190684 A1* | 8/2006 | McCammon et al. | | 711/117 |
| 2006/0195882 A1* | 8/2006 | Tischer et al. | | 725/116 |
| 2006/0236847 A1* | 10/2006 | Withop | | 84/612 |
| 2006/0248209 A1* | 11/2006 | Chiu et al. | | 709/231 |
| 2006/0259492 A1* | 11/2006 | Jun et al. | | 707/9 |
| 2006/0259589 A1* | 11/2006 | Lerman et al. | | 709/219 |
| 2006/0259852 A1* | 11/2006 | Upendran et al. | | 715/500.1 |
| 2006/0259982 A1* | 11/2006 | Upendran | | 726/27 |
| 2006/0265281 A1* | 11/2006 | Sprovieri et al. | | 705/14 |
| 2006/0265489 A1* | 11/2006 | Moore | | 709/223 |
| 2006/0277457 A1 | 12/2006 | Salkind et al. | | |
| 2006/0277460 A1 | 12/2006 | Forstall et al. | | |
| 2006/0288011 A1* | 12/2006 | Gandhi et al. | | 707/10 |
| 2006/0288111 A1* | 12/2006 | Katinsky et al. | | 709/228 |
| 2007/0016609 A1* | 1/2007 | Kim et al. | | 707/104.1 |
| 2007/0022438 A1 | 1/2007 | Arseneau et al. | | |
| 2007/0038672 A1 | 2/2007 | Plastina et al. | | |
| 2007/0043583 A1* | 2/2007 | Davulcu et al. | | 705/1 |
| 2007/0043766 A1* | 2/2007 | Nicholas et al. | | 707/104.1 |
| 2007/0050446 A1* | 3/2007 | Moore | | 709/203 |
| 2007/0050458 A1 | 3/2007 | Rotzoll et al. | | |
| 2007/0055748 A1* | 3/2007 | Kim et al. | | 709/219 |
| 2007/0055997 A1* | 3/2007 | Witwer | | 725/81 |
| 2007/0060099 A1* | 3/2007 | Ramer et al. | | 455/405 |
| 2007/0061204 A1* | 3/2007 | Ellis et al. | | 705/14 |
| 2007/0061487 A1* | 3/2007 | Moore et al. | | 709/246 |
| 2007/0077921 A1 | 4/2007 | Hayashi et al. | | |
| 2007/0078712 A1* | 4/2007 | Ott et al. | | 705/14 |
| 2007/0078713 A1 | 4/2007 | Ott et al. | | |
| 2007/0078772 A1* | 4/2007 | Dadd | G06Q 30/06 | 705/52 |
| 2007/0083897 A1 | 4/2007 | Brownell | | |
| 2007/0088727 A1* | 4/2007 | Kindig | | 707/101 |
| 2007/0088832 A1* | 4/2007 | Tsang et al. | | 709/227 |
| 2007/0094076 A1* | 4/2007 | Perkowski et al. | | 705/14 |
| 2007/0100836 A1* | 5/2007 | Eichstaedt et al. | | 707/10 |
| 2007/0112837 A1* | 5/2007 | Houh et al. | | 707/102 |
| 2007/0116036 A1* | 5/2007 | Moore | | 370/462 |
| 2007/0116037 A1* | 5/2007 | Moore | | 370/462 |
| 2007/0118590 A1* | 5/2007 | Giacalone | | 709/201 |
| 2007/0125852 A1* | 6/2007 | Rosenberg | G11B 5/5582 | 235/435 |
| 2007/0156726 A1 | 7/2007 | Levy | | |
| 2007/0156729 A1* | 7/2007 | Dickinson et al. | | 709/203 |
| 2007/0156855 A1* | 7/2007 | Johnson | | 709/219 |
| 2007/0162165 A1* | 7/2007 | Stirbu et al. | | 700/65 |
| 2007/0168354 A1* | 7/2007 | Ramer et al. | | 707/10 |
| 2007/0174255 A1* | 7/2007 | Sravanapudi et al. | | 707/3 |
| 2007/0192352 A1 | 8/2007 | Levy | | |
| 2007/0197294 A1* | 8/2007 | Gong | | 463/42 |
| 2007/0208759 A1* | 9/2007 | von Koch et al. | | 707/100 |
| 2007/0213857 A1 | 9/2007 | Bodin et al. | | |
| 2007/0234213 A1* | 10/2007 | Krikorian et al. | | 715/716 |
| 2007/0239611 A1* | 10/2007 | Blum | | 705/51 |
| 2007/0240030 A1* | 10/2007 | Cronstrom | | 715/500.1 |
| 2007/0244880 A1* | 10/2007 | Martin | | G06F 17/30038 |

(56) References Cited

U.S. PATENT DOCUMENTS

| | | | | |
|---|---|---|---|---|
| 2007/0266031 | A1* | 11/2007 | Adams et al. | 707/10 |
| 2007/0276866 | A1* | 11/2007 | Bodin et al. | 707/104.1 |
| 2007/0282898 | A1* | 12/2007 | Stark | H04H 20/10 |
| 2007/0291404 | A1 | 12/2007 | Morse et al. | |
| 2007/0299743 | A1* | 12/2007 | Staib et al. | 705/27 |
| 2007/0299873 | A1* | 12/2007 | Jones et al. | 707/104.1 |
| 2007/0299874 | A1* | 12/2007 | Neumann et al. | 707/104.1 |
| 2008/0021777 | A1* | 1/2008 | Mack et al. | 705/14 |
| 2008/0028037 | A1* | 1/2008 | Moyer et al. | 709/217 |
| 2008/0071819 | A1* | 3/2008 | Monsarrat | 707/102 |
| 2008/0086689 | A1* | 4/2008 | Berkley et al. | 715/731 |
| 2008/0091521 | A1* | 4/2008 | Ho et al. | 705/14 |
| 2008/0092158 | A1 | 4/2008 | Bhatnagar et al. | |
| 2008/0111822 | A1 | 5/2008 | Horowitz et al. | |
| 2008/0126476 | A1* | 5/2008 | Nicholas et al. | 709/203 |
| 2008/0126935 | A1* | 5/2008 | Blomgren | 715/716 |
| 2008/0187279 | A1* | 8/2008 | Gilley et al. | 386/52 |
| 2008/0209483 | A1* | 8/2008 | Lemmers et al. | 725/105 |
| 2008/0214155 | A1* | 9/2008 | Ramer et al. | 455/414.1 |
| 2008/0215645 | A1* | 9/2008 | Kindig et al. | 707/205 |
| 2008/0234000 | A1* | 9/2008 | Silverbrook et al. | 455/556.1 |
| 2008/0244091 | A1* | 10/2008 | Moore et al. | 709/246 |
| 2008/0288874 | A1 | 11/2008 | Hoyle | |
| 2008/0319856 | A1* | 12/2008 | Zito et al. | 705/14 |
| 2009/0007176 | A1* | 1/2009 | Casey et al. | 725/39 |
| 2009/0070267 | A9* | 3/2009 | Hangartner | 705/59 |
| 2009/0076881 | A1 | 3/2009 | Svendsen | |
| 2009/0132349 | A1* | 5/2009 | Berkley et al. | 705/10 |
| 2009/0172773 | A1* | 7/2009 | Moore | 726/1 |
| 2009/0222392 | A1* | 9/2009 | Martin | G11B 27/105 706/46 |
| 2009/0228544 | A1* | 9/2009 | Demers et al. | 709/201 |
| 2009/0239573 | A1* | 9/2009 | Kretz | G11B 27/105 455/550.1 |
| 2009/0240721 | A1* | 9/2009 | Giacalone, Jr. | 707/101 |
| 2009/0299857 | A1* | 12/2009 | Brubaker | 705/14.66 |
| 2010/0161091 | A1* | 6/2010 | Takatsuka | G11B 19/025 700/94 |
| 2010/0161826 | A1* | 6/2010 | Miner et al. | 709/231 |
| 2010/0269138 | A1* | 10/2010 | Krikorian et al. | 725/39 |
| 2010/0287048 | A1* | 11/2010 | Ramer et al. | 705/14.46 |
| 2010/0293048 | A1* | 11/2010 | Singolda et al. | 705/14.43 |
| 2010/0293057 | A1* | 11/2010 | Haveliwala et al. | 705/14.66 |
| 2010/0332483 | A1* | 12/2010 | Brownell | 707/754 |
| 2011/0029378 | A1* | 2/2011 | Ramer et al. | 705/14.46 |
| 2011/0029387 | A1* | 2/2011 | Ramer et al. | 705/14.64 |
| 2011/0125594 | A1* | 5/2011 | Brown et al. | 705/14.73 |
| 2011/0164056 | A1* | 7/2011 | Ording | G06F 1/1694 345/649 |
| 2013/0191749 | A1* | 7/2013 | Coburn, IV | G06F 3/01 715/716 |
| 2013/0254207 | A1* | 9/2013 | Coburn et al. | 707/740 |

OTHER PUBLICATIONS

Extensible Markup Language definition from Wikipedia (http://web.archive.org/web/20061018055428/http://en.wikipedia.org/wiki/XML dated Oct. 18, 2006 and last accessed on Sep. 26, 2012.*

A Beginner's Guide to the XML DOM (by Brian Randell dated Oct. 1999 from http://msdn.microsoft.com/en-us/library/aa468547.aspx, last accessed Sep. 26, 2012.*

Secrets of RSS (book by Steven Holzner, pub date: Jun. 7, 2006; Print ISBN-10: 0-321-42622-3; Print ISBN-13: 978-0-321-42622-2).*

U.S. Appl. No. 13/758,245, filed Feb. 4, 2013 (file is available to the examiner).

* cited by examiner

| | | |
|---|---|---|
| 1 | xmlns:uact="http://example-user-interaction-names-space.com/spec" | 161 |
| 2 | <uact:comments server=http://honeymonkey.com/comment-svr/" id="213"<br>/>                      163 | 162 |
| 3 | <uact:coupon id="20060001b" server=http://honeymonkey.com/coupon-svr/" >    176                    177<br>  <uact:coupon-title>Buy 1 get 1 free</uact:coupon-title> 173<br>  <uact:coupon-valid-until>12/1/2006</uact-coupon-valid-until> 174<br>  <uact:coupon-restrictions>one per household</uact-coupon-restrictions>                    175<br></uact:coupon>    181 | 170 |
| 4 | <uact:call number="555-2222" title="snack sales department" /> | 180 |
| 5 | <uact:reservation server="http://honeymonkey.com/cafe/reservation-svr">    192<br>  <uact:reservation-title>Treehouse Café</uact:reservation-title><br>  <uact:reservation-send name="party_name" /><br>  <uact:reservation-send name="party_number" /><br>  <uact:reservation-send name="time" />    191<br>  <uact:reservation-send name="phone_number" /><br>  <uact:reservation-send name="special_requests" /><br></uact:reservation> | 190 |
| 6 | <uact:quickreply server="http://honeymonkey.com/replies/" id="222"><br>  <uact:quickreply-question>Do you like sweet, hot or super spicy?<br>  </uact:quickreply><br>  <uact:quickreply-option>sweet</uact:quickreply-option><br>  <uact:quickreply-option>hot</uact:quickreply-option><br>  <uact:quickreply-option>super spicy</uact:quickreply-option><br>  <uact:quickreply-type-msg/><br></uact:quickreply> | 200 |
| 7 | ...<br><item><br>  <title>Spicy Mango Chutney</title><br>  <description>My mango chutney comes in sweet, spicy and super spicy. It is yummy as a dip or with meat</description><br>  <uact:comments server=http://honeymonkey.com/comment-svr/"<br>id="213" />    211<br></item> | 210 |
| 8 | ...<br><item><br>  <title>Treehouse Café</title><br>  <description>Coffee, hot cocoa, cakes, pies, cookies, and cool atmosphere</description><br>223   <uact:reservation<br>spec="http://honeymonkey.com/cafe/reservations.xml"/><br></item>    224<br>... | 220 |

```
<!-- ITEM TITLES -->
        function load_item_title(){
            var item_title_array = new Array();
            <xsl:apply-templates select="rss/channel/item/title"/>
  321     <xsl:apply-templates select="atom:feed/atom:entry/atom:title"/>
            <xsl:apply-templates select="rdf:RDF/rss1:item/rss1:title"/>
//          alert(item_title_array.join('\n'));
            return item_title_array;
        }
```

FIG. 15A

FIG. 15B

```
<!DOCTYPE HTML PUBLIC "-//W3C//DTD HTML 3.2 Final//EN">
<html>
 <head>
  <title>Index of /treehouse/samples/venice</title>          347
 </head>
 <body>
<h1>Index of /treehouse/samples/venice</h1>
<pre><img src="/icons/blank.gif" alt="Icon " /> <a href="?C=N;O=D">Name</a>
<img src="/icons/image2.gif" alt="[IMG]" /> <a href="100_0445_M.JPG">100_0445_M.JPG</a>
<img src="/icons/image2.gif" alt="[IMG]" /> <a href="100_0446_M.JPG">100_0446_M.JPG</a>
<img src="/icons/image2.gif" alt="[IMG]" /> <a href="100_0447_M.JPG">100_0447_M.JPG</a>
<img src="/icons/image2.gif" alt="[IMG]" /> <a href="100_0448_M.JPG">100_0448_M.JPG</a>
<img src="/icons/image2.gif" alt="[IMG]" /> <a href="100_0449_M.JPG">100_0449_M.JPG</a>
<img src="/icons/image2.gif" alt="[IMG]" /> <a href="100_0450_M.JPG">100_0450_M.JPG</a>
```

FIG. 15C
100_0466_M.JPG  342
100_0466_M.txt  343
FIG. 15D
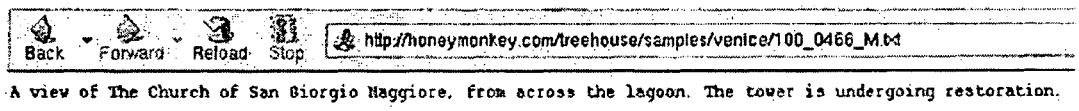
A view of The Church of San Giorgio Maggiore, from across the lagoon. The tower is undergoing restoration.
FIG. 15E
100_0467_M.JPG  342
100_0467_M.xml  344
FIG. 15F
```
<author>dan@honeymonkey.com</author>   345
<title>San Marco</title>
<description>View of San Marco from a vaporetto going towards San Giorgio</description>
```

AD-HOC WEB CONTENT PLAYER

This application claims priority under 35 U.S.C. §119 to U.S. Provisional Patent Application Ser. No. 60/866,635, filed Nov. 21, 2006, and entitled "Media Player" the entire contents of which are hereby incorporated by reference.

BACKGROUND

This invention relates to techniques for accessing and interacting with information in particular content that is accessible over the Internet.

The Internet affords a large mixture of content, most often presented as web pages, a page-sized formatted document with text, images, other media, and hyperlinks. Browsing the Internet usually involves accessing a web page and clicking on hyperlinks to arrive at an linked web page. Information is presented to the user in chunks of "pages" that require typing of search terms or addresses (URLs) and clicking on hyperlinks.

A feed is a dataset, not inherently formatted or suitable for direct user access. Feed readers are used to search though feeds provided by web sites. Feeds can also be viewed as a web page, formatted by web-based feed services.

SUMMARY

While browsing the web, a form of navigation of content, involves starting at a web page and moving to other content by clicking on hyperlinks to open other web resources, in some situations, this technique of receiving information is difficult or undesired. First, small devices such as cell phones and person digital assistants (PDA's) that are now able to browse the web are not well suited for this type of navigation. Because, control of small devices, including clicking and typing is limited and difficult for many users. In addition, large public displays such as kiosks and large flat panel displays can be hooked up to the web but often cannot or do not allow browsing input by the user, even though changing, dynamic content would be appropriate. Further, desktop and laptop computer users may want to see a large assortment of information but do not have the time or desire to click to various pages to see this information, especially if the information changes often, thus needing re-visiting.

According to an aspect of the invention a system includes a processor, a display, and a memory executing a computer program for dynamic playback of information from conventional feeds and ad-hoc feeds. The computer program product includes instructions to cause the processor to produce "playable" content from ad-hoc feeds, manage a queue of queue items of playable content that includes playable content from the ad-hoc feeds, play the queued items by cycling through queued items in the queue according to criteria specified for play back of the content and render a player window on the display of the system to display the playable content in at least one player window.

The following are embodiments within the scope of the claims.

The single or simultaneous, asynchronous players run on the device, each having play engines that cycle though the queued items. The items can be played without interaction. The items syndication feeds, podcast feeds and web folders of images. The system includes a set of interaction tools to facilitate interaction with the queued items, as the queued items are played, and to perform operations on the played item. The interactions include at least one of to make comments, to purchase an item, to make a call, and to make a reservation. The system includes a module to transform content into ad-hoc feeds. The player is integrated into a browser and is available at any time to load feeds during browsing. The player is a site-tool for playing products on an e-commerce site. The play engine includes a promo box that provides quick links to playable content, where a link in the promo box can be clicked on and a player loaded immediately, as opposed to having to drag-and-drop content from a browser page. Sponsored messages, links, and advertisement are shown in the promo box to generate revenue and providing additional content. The user controls the type of information sent to their promo box, by topic location, time, audience, activity, and other properties.

According to an additional aspect of the invention, a method executed on a device, the method includes receiving playable feeds of content, dynamically playing the content by queuing items comprising playable content and cycling through the queued items to play the content.

The following are embodiments within the scope of the claims.

The playable content includes ad-hoc feeds and the method includes converting the ad-hock feeds to produce the playable content.

According to an additional aspect of the invention, a computer implement method of generating revenue from promotions, the method includes offering promotion slots by set price and time requirements and running the promotions in a round robin sequence or a sequence based on user factors.

The following are embodiments within the scope of the claims.

The method reaches a large audience for a fixed or low cost. For a given sign-up period, fewer promotions get more play time. For a given sign-up period more promotions get less play time.

According to an additional aspect of the invention, a computer program product residing on a computer readable medium for playing content, the computer program product includes instructions for causing a device to queue items of playable content, execute a play engine that cycles through queued items to play the items, and provide interaction tools for items based on at least one of context of the user, device and location.

According to an additional aspect of the invention, a system for dynamically playing information using conventional feeds and ad-hoc feeds to produce "playable" content includes a device player that executes a player engine, the player engine collecting, combining and sequencing items to play based on selection criteria and device context, of text, image, video content by, parsing selective tags, patterns, text, identifiers and resource types of interest on resources such as web pages to produce playable content. The device also includes functionality for storing the playable contents results from parsing in a queue of playable feed items, selecting items from the queue to produce an ad-hoc feed and playing the ad-hoc feed.

The invention uses conventional feeds and ad-hoc feeds to provide "playable" content that are collected, combined, and sequenced for display. At regular user configurable intervals, e.g., every 5-10 seconds 20-40 seconds as well as other intervals, another item in the play sequence is shown. Conventional feeds are inherently summary in nature. Making "ad-hoc" feeds from web resources such as pages, images and media collections broadens the available playable contents. Combinations of content from many sources based on user preferences and device contexts, such as location, enhances the variety of such available content. The user need not interact with the device after play is started. The contents can cycle, automatically refreshing. Multiple play-screens can operate at the same time, presenting information as text, images, video and other media in parallel. Interaction occurs when the user selects an item of interest to the user.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 10G depicts supporting xml tags for the tools of FIGS. 10A-10F.

FIGS. 15A-H are a series of diagrams useful for understand a Web folder player example

DETAILED DESCRIPTION

Described is a system for dynamic sharing of information using conventional feeds and ad-hoc feeds to produce "playable" content suitable for desktop computers, kiosks, and mobile devices. Playable content are items that include news, messages, products for sale, photos and other media, that is selected, sequenced, and shown in a concise manner. A play "engine" cycles through queued items of content. Users run single or simultaneous, asynchronous (i.e. independent) players. Items can be played without interaction by the user. However, an item of interest can be focused on, viewed in detail, and interacted with at the discretion of the user. Quick interaction tools facilitate interaction with an item to perform operations such as to view or make comments, purchase an item, make a call, make a reservation, or otherwise interact with an item in a defined manner. Such interactions can use the context and information of the item of interest, user preferences, and the device context to streamline interaction.

Ad-hoc feeds are web resources interpreted and transformed into "playable" feed-like content. The player is a client-tool that is integrated into a browser and be available at any time to load feeds during browsing. Alternatively, the player is a site-tool such as for playing products on an e-commerce site.

The player enables users to load and play feeds (e.g., RSS (Really Simple Syndication protocol), podcast feeds and other "playable" content (e.g. web folders of images). Playable content can be news, products for sale, services, announcements, images and other media, journals, and messages. For desktop computing uses, the played feed is asynchronous and independent of the main browser window, so the user can play content at the same time as browsing conventional web-page content. In mobile devices, "playing" content reduces the need for user interaction while providing dynamically changing content. This is particularly important on small mobile devices and when the user cannot devote much attention or fine motor control to the device. Playing can be stopped to focus on an item of interest at any time. A history of loaded feeds is automatically saved so the user can reload them again directly.

Feeds are datasets, usually stored in as extensible markup language (XML). There are various versions, but most have in common a title, description, and a set of news items, each with a title and description. Feeds do not inherently have a display format or interactivity. The Player uses feeds and other data to expand the current notion of "browsing."

Figure 1:
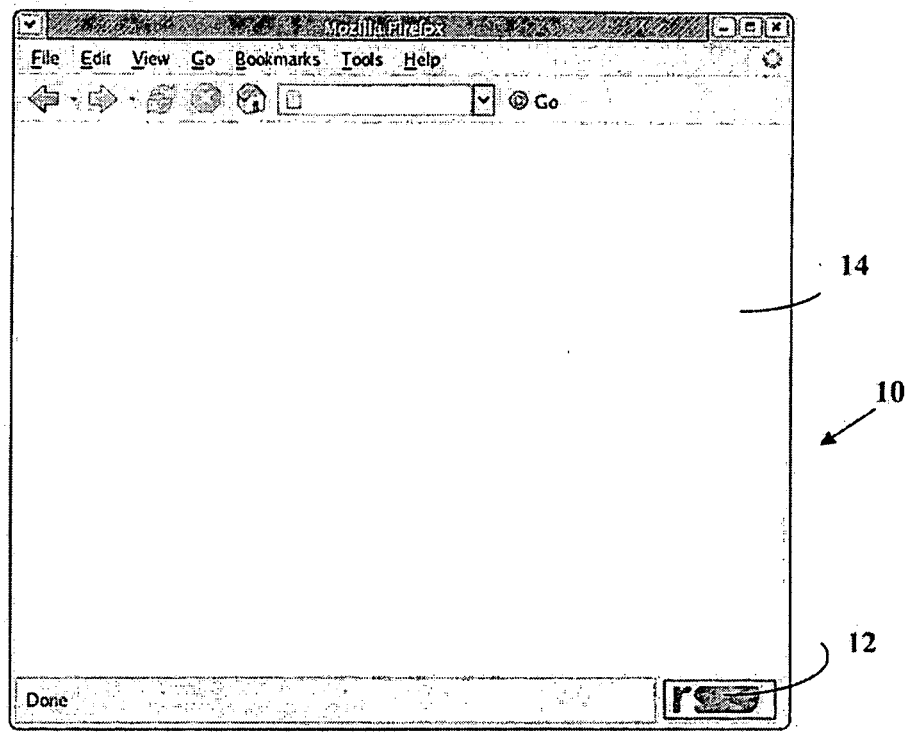
FIG. 1 is a diagram depicting a browser window having integrated player tool.

Referring to FIG. 1, an application 10 for launching a player 20 (FIG. 3) is shown comprised of an integrated extension 12 to a web browser 14 window. The integrated extension 12 is depicted as an icon on a toolbar or menu within the web browser 14. Described later in the document is a site-based version which is server-based instead of client-browser-based. The integrated extension 12 is available during browsing to load and play feeds as they are found.

Figure 2:
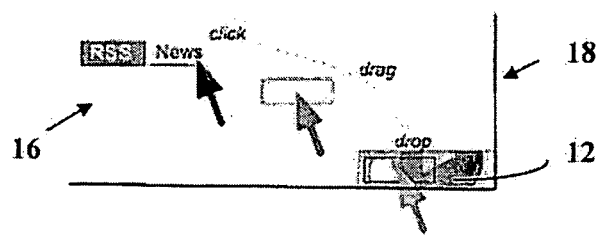
FIG. 2 depicts dragging and dropping a feed into the player tool

Referring to FIG. 2, as a user browses web pages that have links to feeds 16 often shown as orange "RSS", "XML", "Atom", "Pod" icons on such pages. A user drags and drops such feeds and other types of URL links onto the integrated extension 12 causing the application 10 to load and process the dragged and dropped linked contents, which results in playing of the feed in a small pop-up window 20 (FIG. 3).

Details of loading and conversion of these feeds are set out below in FIG. 14.

Figure 3:
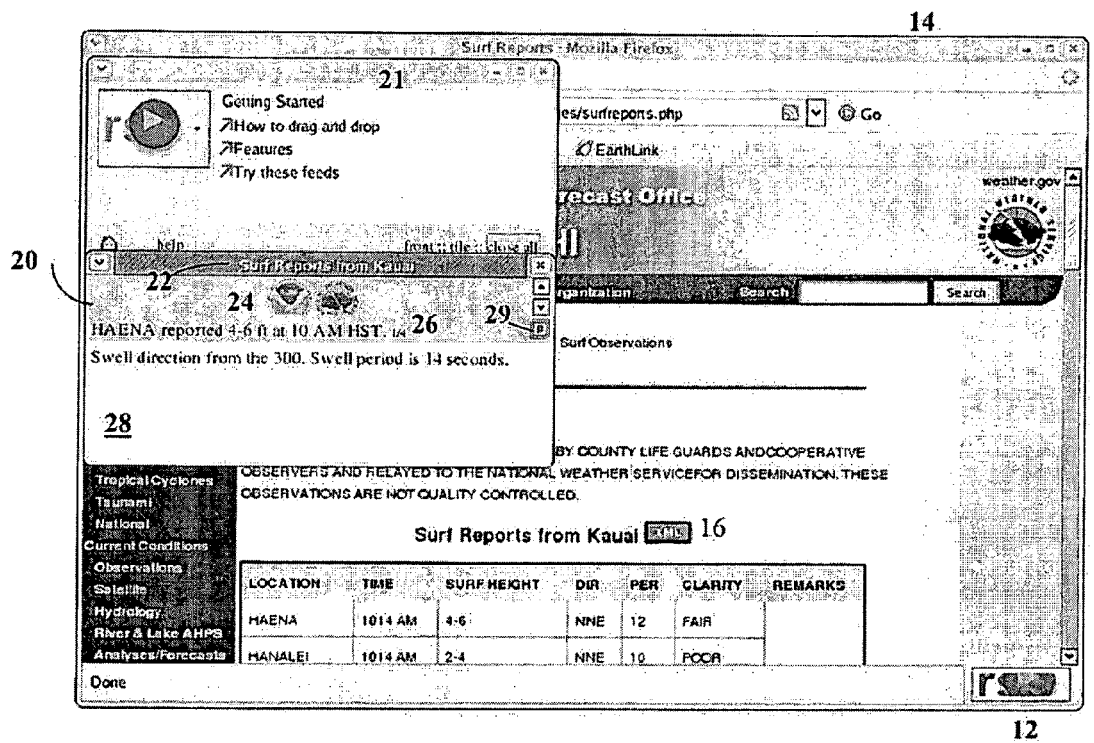
FIG. 3 depicts a feed loaded into a popup player window overlaid on the browser window of FIG. 1.

Referring to FIG. 3, dragging and dropping an "xml" 16 link onto the integrated extension 12 plays a feed about, e.g., "Surf Reports from Kaui." The feed title becomes a popup window 20 title 22. The feed image becomes a banner 24 to recognize its source. For each item shown, a title 26 appears linked to its source document. A description of the document 28 appears under the title 26. A small unobtrusive pause button 29 is shown during play, allowing the user to stop and control the player. The player window 20 operates independently of the main browser window 14, and can be viewed in parallel as the user continues to browse various web sites.

Figure 4:
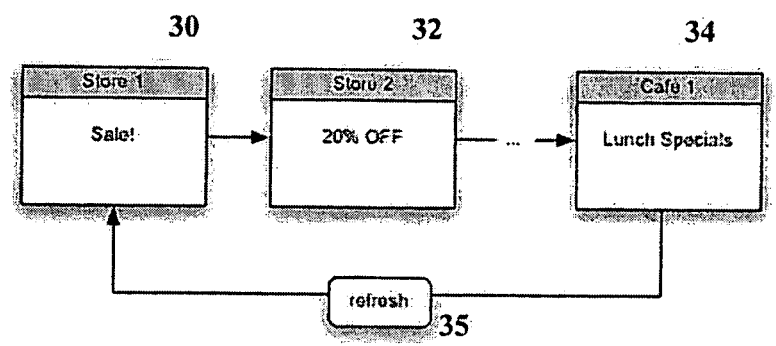
FIG. 4 depicts is a playing a sequence of feed items.
Figure 5A:
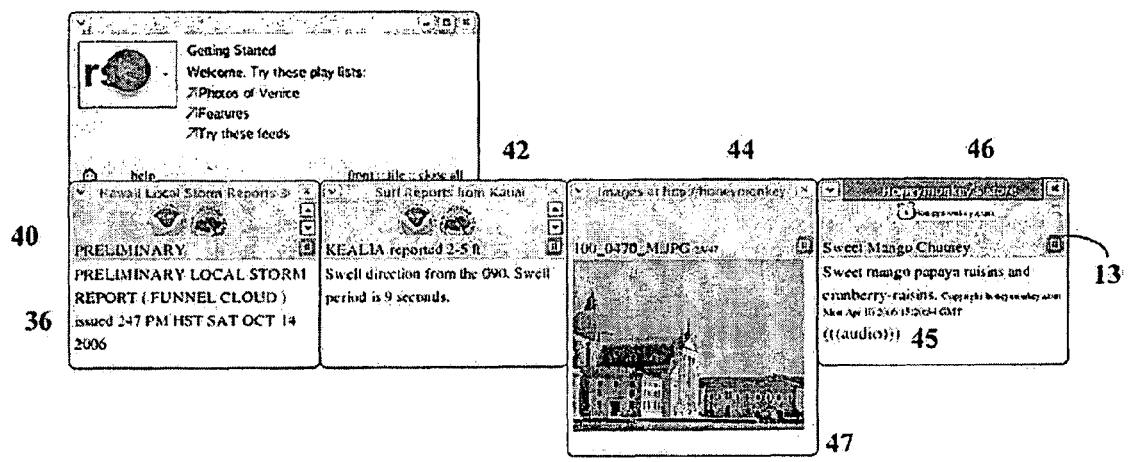
FIGS. 5A-5B are a series of popup player windows depicting various content types and a control pad.
Figure 5B:
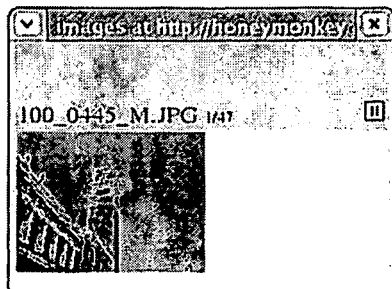
Figure 5B:
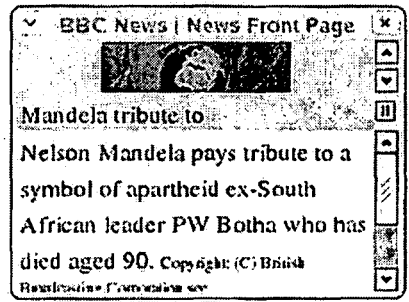
Figure 5B:
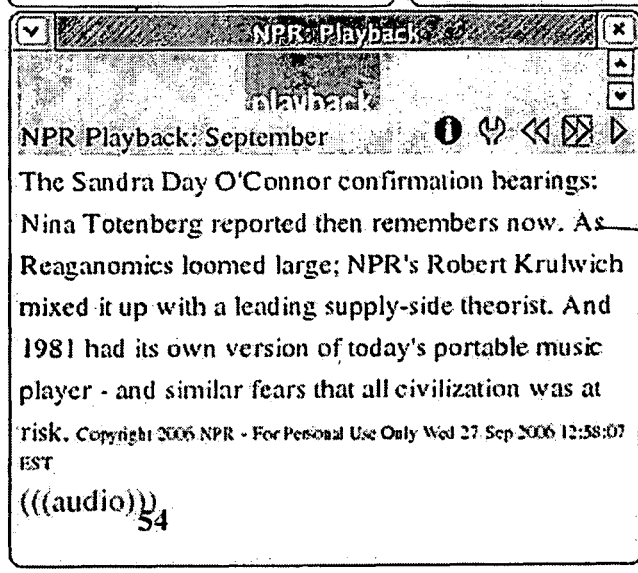

Referring now to FIG. 4, the items of content 30, 32, 34 to be played are sequenced and shown for a few seconds. Each "item" in the feed is shown in sequence. The sequence of items 30, 32, 34, "loop," allowing the user many opportunities to read the items. The contents of a played feed can be set to refresh 35, providing a new and changing set of items on display.

Referring now to FIG. 5, during the course of web browsing, many feeds 40, 42, 44, 46 can be launched and played, resulting in an array of players 20, each independently displaying content in timed sequences. These players 20 are independent of the main browser window, allowing the user to continue with conventional browsing, while also showing (playing) feed contents in a small, concise visual manner. For example, a user can be viewing weather reports 40 and 42, while viewing travel photos 44, news 41 and products for sale 46 from various feeds. At any point, an item that catches the user's attention can be jumped to by, e.g., clicking on the title. Each player and each item shown is distinguished by its source title, the source banner (if supplied), item title, and description. If each item has a publication date and author, this information is shown as well. Podcasts 50 are also a type of "feed" that can be shown. The description 52 of the podcast is shown and a link 54 to launch an audio player (not shown) is available. A sequence of podcasts can be shown and the viewer can pick the one(s) to launch (using an external application), even without pausing.

Figure 6:
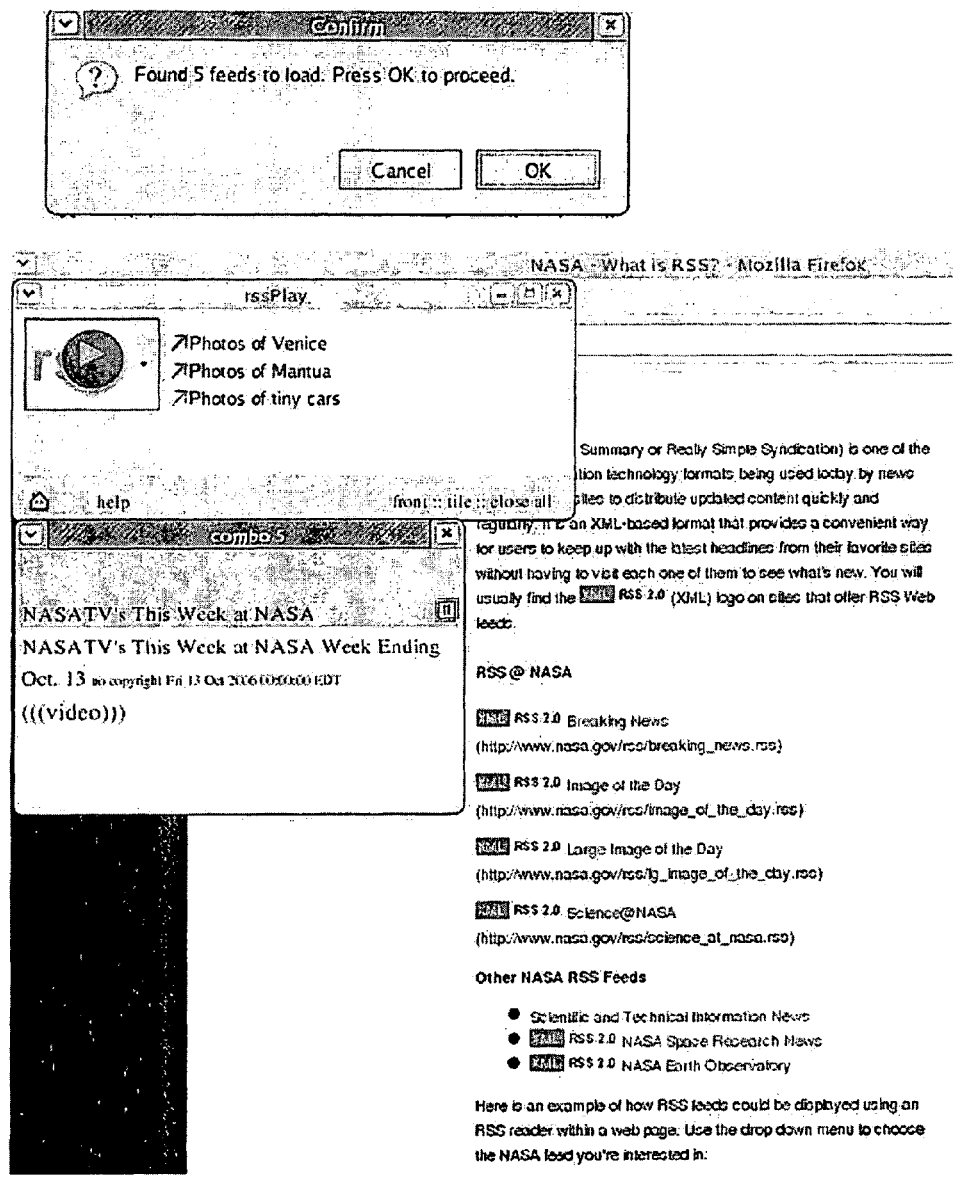
FIG. 6 is a diagram that depicts "Munching" of contents on a page into playable contents including a message to process feeds found and combined feeds playing.

Referring to FIG. 6, instead of many players, a single player can be used to combine all loaded feeds, either from one page or from various pages. Instead of individually selecting feeds to play from a page, all feeds on a page are found and combined together for playing. A web page is read by the player and parsed for content that are played, such as a directory of feeds, particular tagged contents, images, or text. Tagged content that is converted into playable content includes (for example) images (html "img src" elements), tagged text (such as html div tag elements), and feed links (html "link" elements, where rel="alternate" type="application/rss+xml"). Specific tags and patterns of tags and values can be used to identify contention pages to convert into "playable" content.

Figure 7:
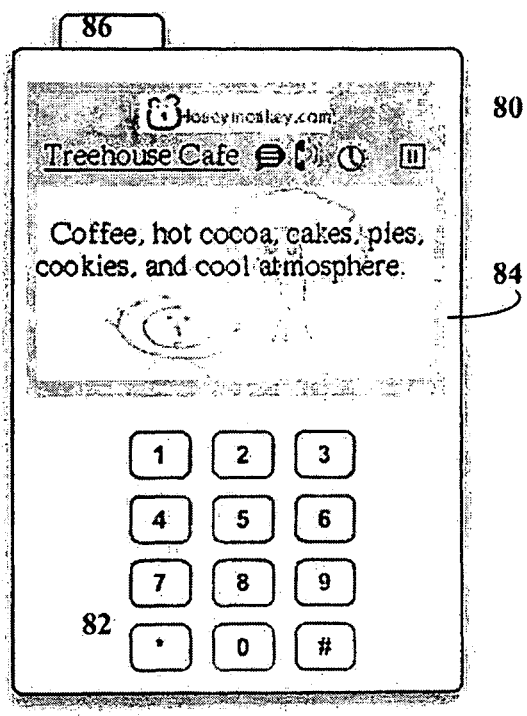
FIG. 7 depicts a portable device with a Player.

Combining feeds into one player window is useful when the user does not prefer many windows on the desktop, or when the user device is small and cannot visually support multiple windows. As shown in FIG. 7 a display in a cell phone 80 (or e.g., personal digital assistant (PDAs)) receives combined feeds. Users need not actively "browse" to receive new information. This is especially useful for small mobile devices, where small controls 82 may be difficult to use and are distracting.

Figure 8:
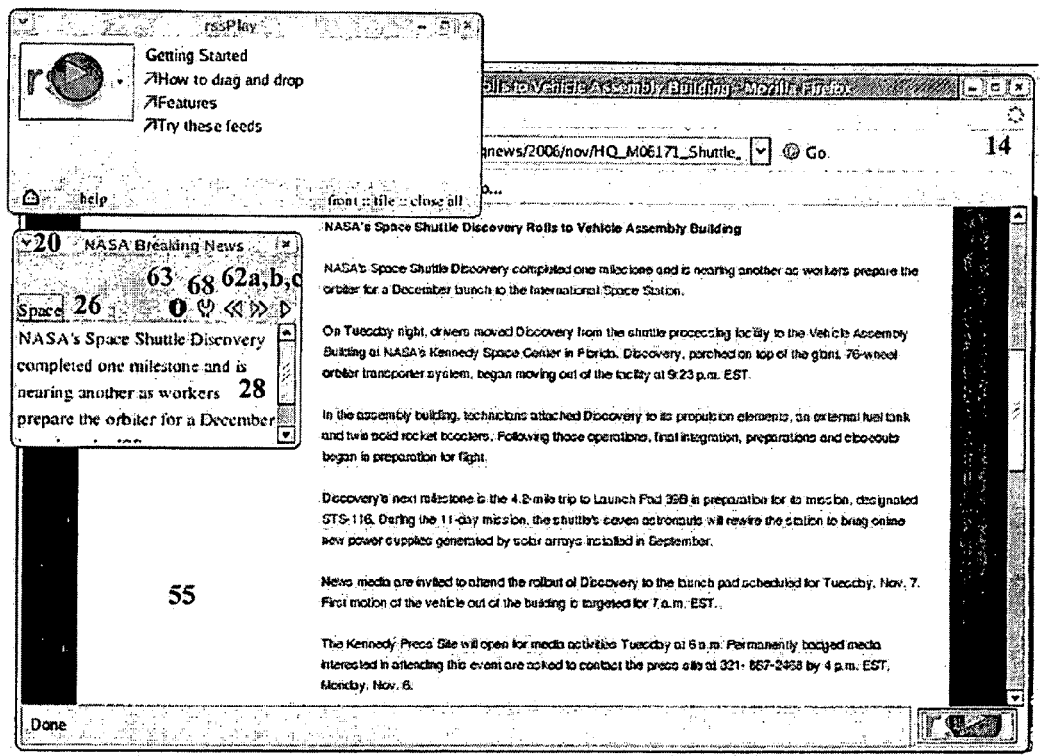
FIG. 8 depicts a Loading linked (title) source to main browser
Figure 9:
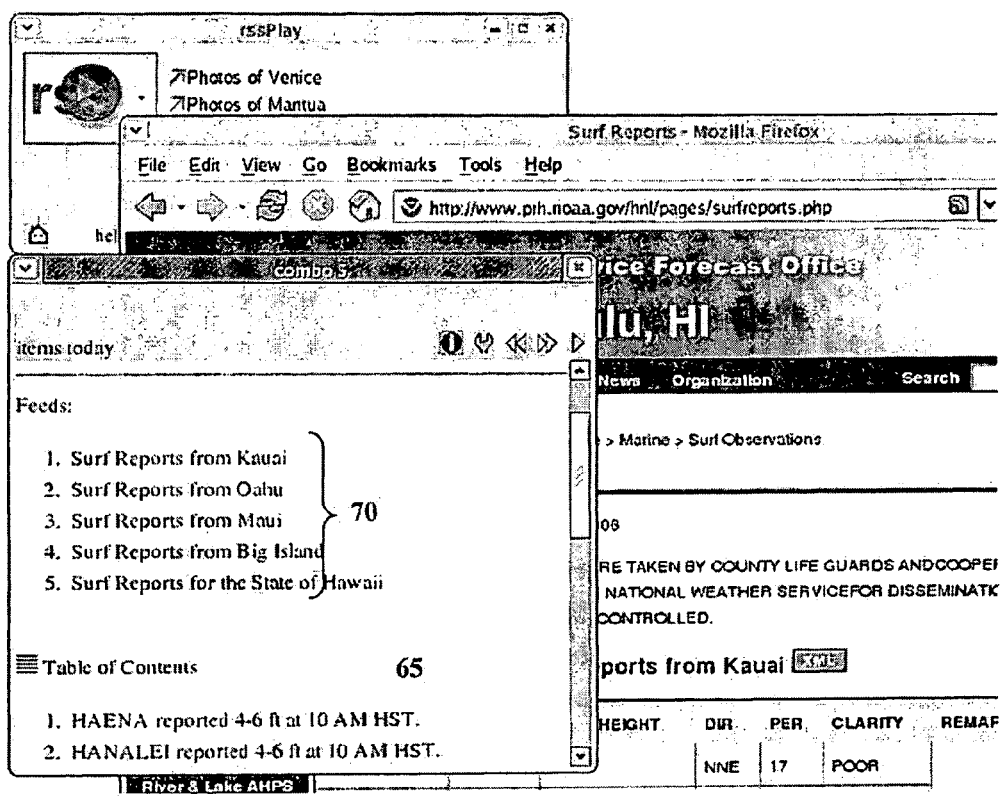
FIG. 9 depicts a Table of Contents for a combined play-list

Referring to FIG. 8, when a feed is playing, a pause, button (not shown in FIG. 9, but as shown in FIG. 6B) is displayed in the navigational tool box. Each feed item is shown for a set number of seconds. The user pauses the play at any time by activating the pause button. The pause button is replaced by other buttons, e.g., forward 62a, backward 62b buttons to move sequentially through the items manually, a play button 62c to resume playing, an information button 63 to show the player's table of contents that lists the titles of each feed and the title of each item in the play-list and a setup button 68 to control settings for this player.

The Player has a table of contents that shows the title(s) of the feed(s), and the titles of each item in the play-list. The table of contents is accessed through the information "i" button 63 in the navigational controls. Clicking on the item's title 26 will show that item. Play resumes at that point or the item's title can be clicked to load the linked page. The title of each item is linked to the url link. Clicking on a title 26, either during play or pause will load the linked resource in a new window or in the main browser window Referring to FIG. 9, players that have combined sources show multiple feed titles 70 in the table of contents. All the feed items are listed 65 after. For combinations of sources in one Player, the format of the Player helps to distinguish each item's source by its banner and title.

Interactive Tools

Figure 10A:
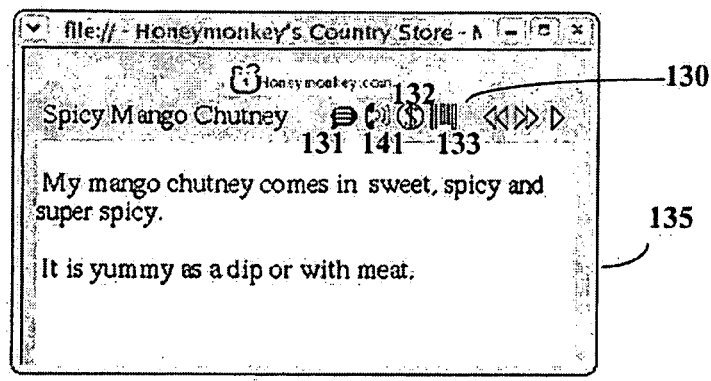
FIGS. 10A-10F are a series of diagrams that depict interactive tools

A player sequences and shows a series of items such as news, images, and video. Each individual item can be, for example, a weather report 40, photographs of travel places 44, or products for sale 46 (of FIG. 5). If the user is interested in a particular item, the player can be paused. The paused item has interactive tools that are relevant to the item as set out in (FIG. 10A, grouping of tools 130). For example, the product for sale 135 in FIG. 10A has a comment tool 131, a call tool 141, a transaction tool 132, and a coupon tool 133. These interactive tools can be part of the item definition (FIG. 10g) or built into the player application, or otherwise dynamically associated with the item. That is, an item, when paused, becomes a 'focused' item of interest. The device and user context can be brought to bear at that moment to offer relevant interactions.

Figure 10B:
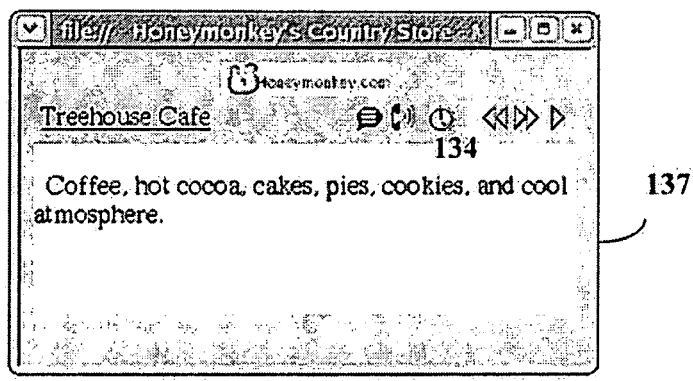
Figure 10C:
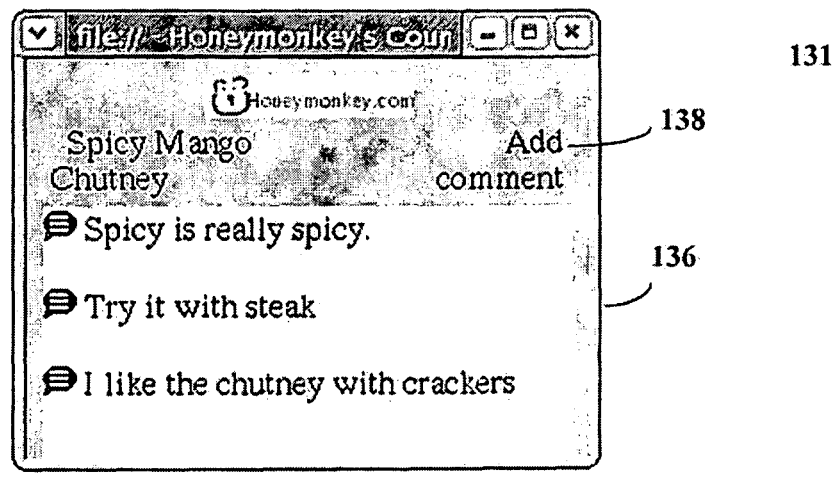
Figure 10D:
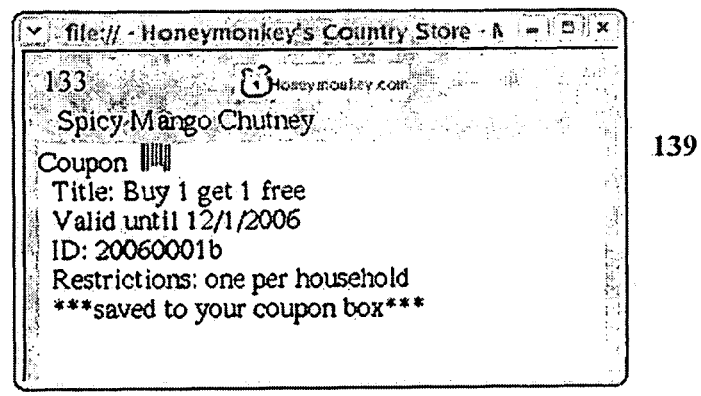

The coupon tool, for example, is an example of an interactive tool to provide users, such as shoppers, the ability to clip and save a coupon of interest (FIG. 10D). The data for the coupon is shown in FIG. 10G, grouping 170, which can be embedded with in a feed XML, within the coupon item, as extra tagged data. XML allows extensions to a given namespace, such as an RSS feed XML namespace), to other XML namespaces 161.

In this example, the feed has embedded extra data for the coupon. The player application, can detect the existence of the data and use the data if it has an appropriate interactive tool. A "tool" can be an icon 133 that is hyperlinked to a URL that leads to further processing of the interaction. For the coupon, the data specified a server URL 177, a coupon id 176, and coupon specific data 173, 174, 175. This data plus information about the user (the user preferences 450 and device context 451 of FIGS. 16 and 18) provide the necessary components of this interactive tool for this feed item.

Diverse interactions and accompanying tools can be produced in an open-ended fashion. The key is to provide custom interactivity relevant to the context of user, item, and device. The coupon tool is one such example, for a shopper. A dining reservation tool (FIGS. 10B and 10F) is an example for a traveler and diner.

Referring to FIGS. 10A-10G, controls can include tools for quick interactions on an item, including a comments tool to show comments about the item, and make a comment about the item; a transaction button, to buy, sell, bid, or otherwise place a transaction in reference to the shown item; a clip tool to remember the particular item like a bookmark or clip more information such as with a coupon a reservation tool, to place a reservation if applicable; a call tool, to automatically contact the originator of the item; a quick response tool, such as to respond yes or no to a question.

Such tools may require additional information beyond that currently in standard feed items. Such information can be added with (xml) tags, as shown in FIG. 10G.

Comment-tool

Referring to FIG. 10A and FIG. 10C, a comment tool 131 that permits quick interaction with devices such as mobile phones and personal digital assistants can aid in ease of use. As an item is displayed, such as one advertising a product 135 "Mango Chutney" (FIG. 10A) if it is of interest, the user pauses the play sequence and any quick-interaction tools available and relevant to the item are displayed. Tools can originate with an item or are associated to the item based on use-context. For example, selecting the comments tool 131, comments 136 can be shown for the item, based on an identifier, url, or other properties. The comments are retrieved on-demand from a comments server, and can reflect the preferences of the user to receive comments originating from oneself, known parties, or the general public. The user can add 138 a comment to the item, and likewise designate the audience who will see it.

Coupon-tool

Referring to FIGS. 10A and 10D, an item of interest can be remembered in more sophisticated ways than just a bookmark. For example, a product item 135 might have a coupon 139 that has specific information related to the coupon. Feeds represented in XML format can have extended tags that define the specifications of a coupon 139, for example, and can be saved for later use. In this example, the product "Mango Chutney" has an offer title, an expiration date, a coupon id, and restrictions. This information can be saved by the user into a personal database and used at a later time, such as in a store to redeem a coupon automatically. The same user, with a mobile device receives feeds while the user is within a store. If the previously clipped coupon, matches with a product offering while shopping or at checkout the previously clipped (saved) coupon can be redeemed by the user.

Contact-tool

Figure 10E:
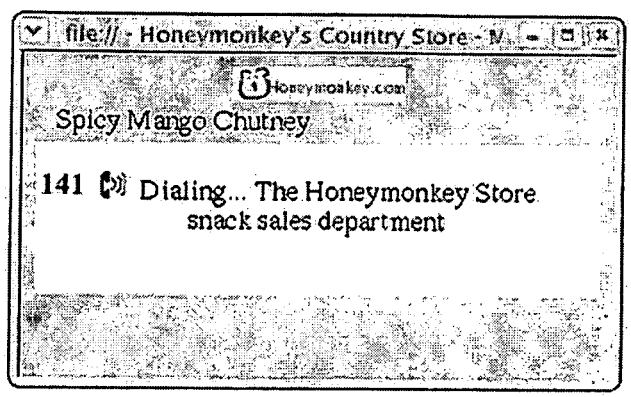

Referring to FIGS. 10A and 10E an item can have contact information such as a phone-number 140 embedded as an additional tag within the item. A call tool 141 can be used to contact the item's source by phone. This is particularly relevant for a player used within a mobile device such as a cell phone or PDA. The user can play items and pause on an item of interest, press the call button 141 to place a call. Interactions can have histories recorded, including items and parties called.

Reservation Tool

Figure 10F:
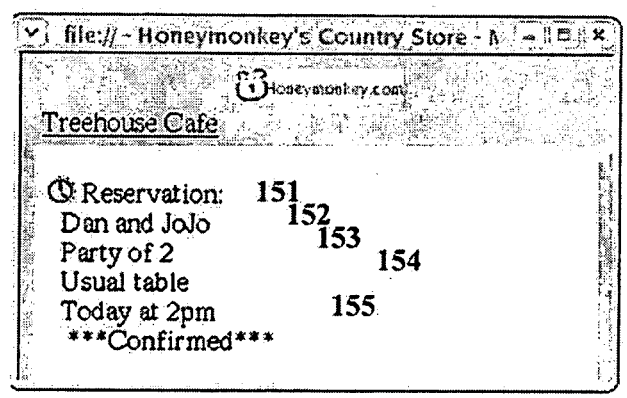

Referring to FIGS. 10B and 10F, an enhancement to making a phone call is the reservation tool, 150 shown in the item for a café 137. Clicking on the reservation icon 151 initiates a request for a reservation by sending a message to a server that handles reservations for the café 137. User preferences for reservations can be used to fill in default reservation specifics, to minimize user entry during this process. For example, the names, 152, information about the number in a party 153, special requests 154 and time 155 can be general or even specific to a restaurant. This example tool 150 shows the use of a combination of personal information, stored within a device or personal account, and general information stored within a feed item to provided an interactive service.

Example Tags

Referring to FIG. 10g, user interactions can be embedded into feed items. In the example, an xml 160 namespace 161 distinguishes the tags from others. Example tags are shown for embedding interaction with an item for comments 162, coupons 170, calling 180, reservations 190, quick responses 200. The example coupon tag 170 has an identifier for the item 176, and a url to a server 177 that manages coupons. The coupon has nested details, such as a title 173, valid until date 174, and use restrictions 175, that are shown if the coupon is interacted with. This information or the unique reference to the id and server can be saved for later use 139. The call tag 180 simply has a number and a title 181, useful for a phone book as well. The reservation tag 190 has a url to the server 192 that will manage reservations for the particular place. The nested "reservation-send" tags 191 are "slots" to be filled by the reservation sender to request a reservation. This information may already be stored in user preferences on the client device or remote server and readily used without user entry.

An item such as a product for sale (FIG. 10A) is partially shown in xml FIG. 10G, as item 210, with additional comments tag 211 that specifies a server and id to retrieve comments from. Alternatively, the item's link can be used as a unique identifier to retrieve comments from servers. The comments do not have to be embedded within the item, but instead are dynamically retrieved on demand if the user initiates a comments interaction 131 with the item. Specifying more than one comments server (within the item or within user preferences) can provide a compilation of comments for an item.

The café item shown 137 of FIG. 10B has an reservation interactive tool 134. The item for a café 137 is partially shown in xml 220 (FIG. 10g) with an addition tag 223 for reservation interaction. Instead of embedding the entire reservation specification, the tag has a reference (url) 224 to it as a remote resource. This resource can be loaded if the user initiates such an interaction 134 for the item resulting in a reservation 150.

Player Control Pad

Figure 11:
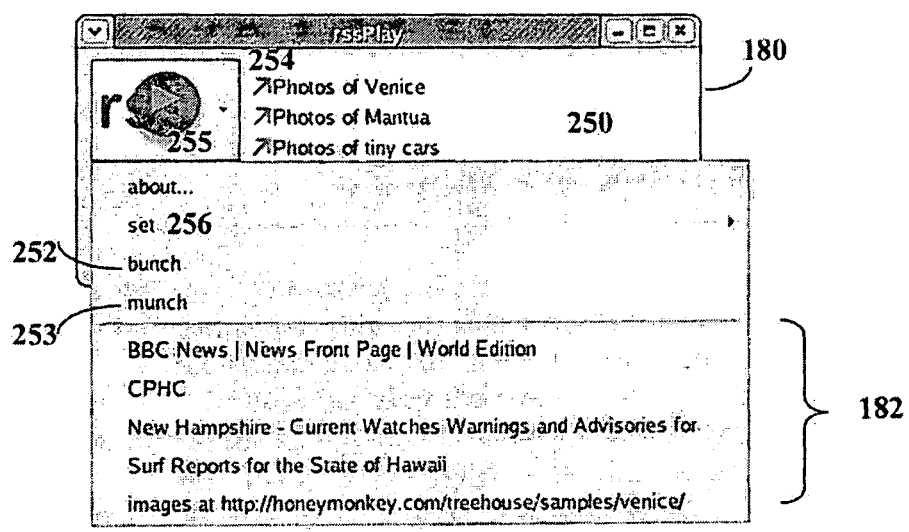
FIG. 11 depicts a control panel pull-down menu with sample history of visited feeds.

Referring to FIG. 11, the player control pad is a popup window 180 that accompanies the player windows. The control pad 180 has a menu-button that can be used to drag-and-drop content, as with the tool icon. The menu-button shows a menu of control-settings and a history of feeds 182. As a user plays feeds, the history of loaded feeds grows. The user can select a feed off this menu to play a feed again at a later session. The title of each feed is listed 182, usually in alphabetical order. If no title is available, the web URL is shown. Rolling over a title will also show the URL so that duplicate titles can be discerned. They history of feeds (and other played content) allows the user to browse and load playable content, then reload and re-play that content at a later time, with new data if available.

The control pad 180 has a menu feature 252 termed "munch" that refers to the parsing of a browsed page to produce a playable feed content. A page of images, for example, can be "munched" to form an "ad-hoc" slideshow feed. A page of titles and paragraphs can be "munched" to form an "ad-hoc" text feed, playable in the play-interface. The control pad 180 menu feature 253 termed "bunch" refers to the collecting of feeds into one playable content set. A page may have any number of feeds. Instead of selecting each one, "bunching" the feeds on a page produces a set of playable feed contents. Features bunch 252 and munch 253 act to select and combine web-based content in an ad-hoc manner suitable for playing.

Promo Box

Referring to back to FIG. 11, the promo box on the player control pad 180 is a small area 250 to show welcome messages to the user, and provide quick links to playable content. Links 254 in the promo box can be clicked on and a player loaded immediately, as opposed to having to drag-and-drop content from a browser page. Each time the player invokes the player tool, either by dragging and dropping a feed-link into the player-tool, or by simply clicking on it, the player control pad is opened and moved to the front of other windows, with an updated contents in the promo box.

Sponsored messages, links, and advertisement can also be shown in this small space, as a way of generating revenue and providing additional content. As an enhanced option, users may control the type of information sent to their promo box, by topic, location, time, audience, activity, and other properties.

Figure 12:
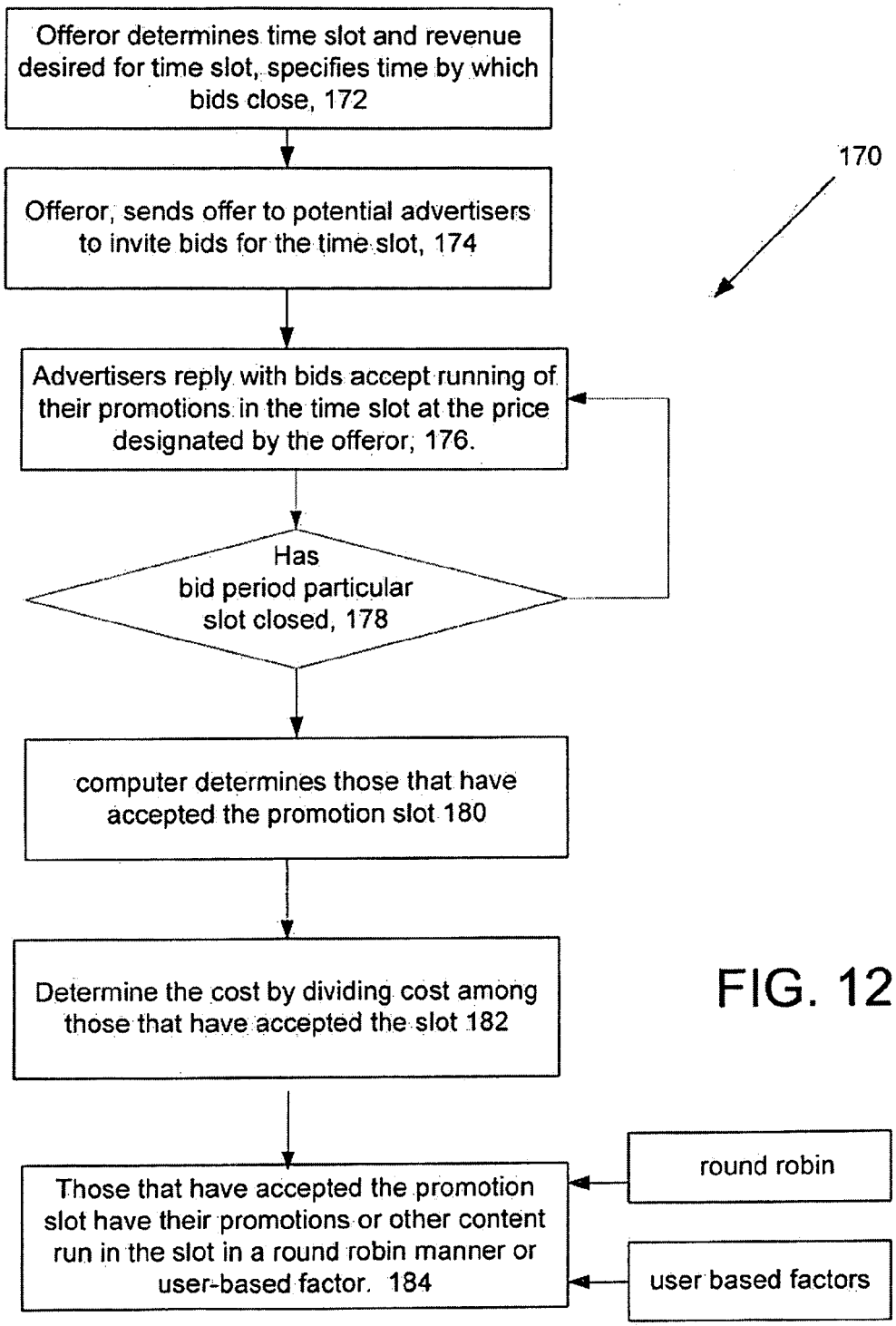
FIG. 12 is a flow chart depicting promotion handling.

Referring to FIG. 12A, a simple mechanism 170 to generate revenue from such promotions. A offeror, e.g., an entity that controls display of promotions in the player 10, sets, time slots, desired revenue, and a time by which potential bidders must reply 172. Offeror sends 174 invitations for bids for the promotion slot by a set price and a set time, such as for a given day at a given time for a fixed price. Advertisers respond with bids for the slot 176. If the bid period for the time has lapsed, the bid period is closed 178. The process determines 180 who signed on and cost for those signed on based on 182 the number of those that have signed on and the target revenue. At the time slot, the promotions are run 184 in either a round robin sequence or based on user factors for those that had signed up.

With process 170, users can sign on to accept a time slot at the price set by the offeror for running their promotions. After the period of time has elapsed for closing acceptance for a particular slot, the computer will determines those who have accepted the promotion slot. Those that have accepted the promotion slot have their promotions or other content run in the slot in a round robin manner or user-based factor. The cost is shared among those that have accepted the slot. If many users have accepted the slot, their promotions will be displayed in round robin or user based factors to the audience that exists during that slot, whereas if few or maybe, e.g., one has accepted the slot, the user's promotions will be displayed to the audience for the entire slot period. The advantage to such a technique is the possibility of reaching a very large audience for a fixed, relatively low cost, because for a given sign-up period, the fewer the number of promotions the more those promotions get more play time. In contrast, the more the number of promotions the less play time each promotion receives.

Figure 13:
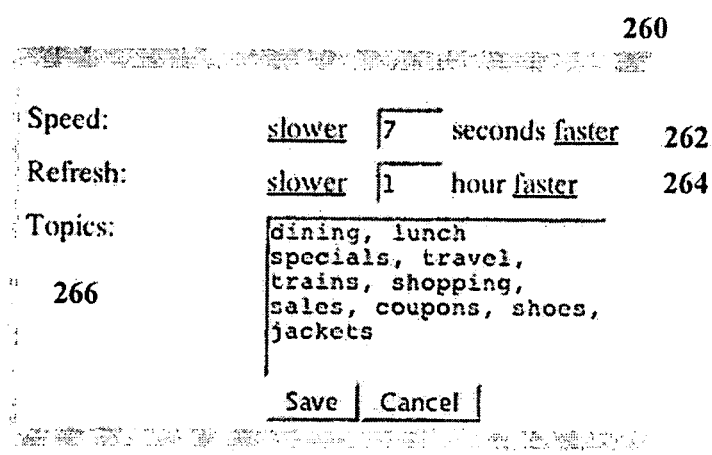
FIG. 13 depicts a player settings window.

Referring to FIG. 13, control settings 260 allow the user to set defaults for the popup window size play speed 262, and refresh period 264. The history can be cleared or exported to a web page for saving or sharing. Players are set to a default refresh cycle 264. This time interval can be set by the user. Feeds have varying time intervals where they are updated by their owner/servers, mostly varying in hours. However, as the medium gets used more, dynamic feeds may change much more frequently.

Items can be selected by specifying selection criteria such as keywords 266 in item titles, descriptions, or categories. This can be further enhanced by the use of additional tags within an item and personal preferences. Selection could remove items from a play-list or re-prioritize the sorting of the play-list. Shown are a list of topics, but this could be more specific, including, sources, authors, specific tags or attributes and values.

Figure 14:
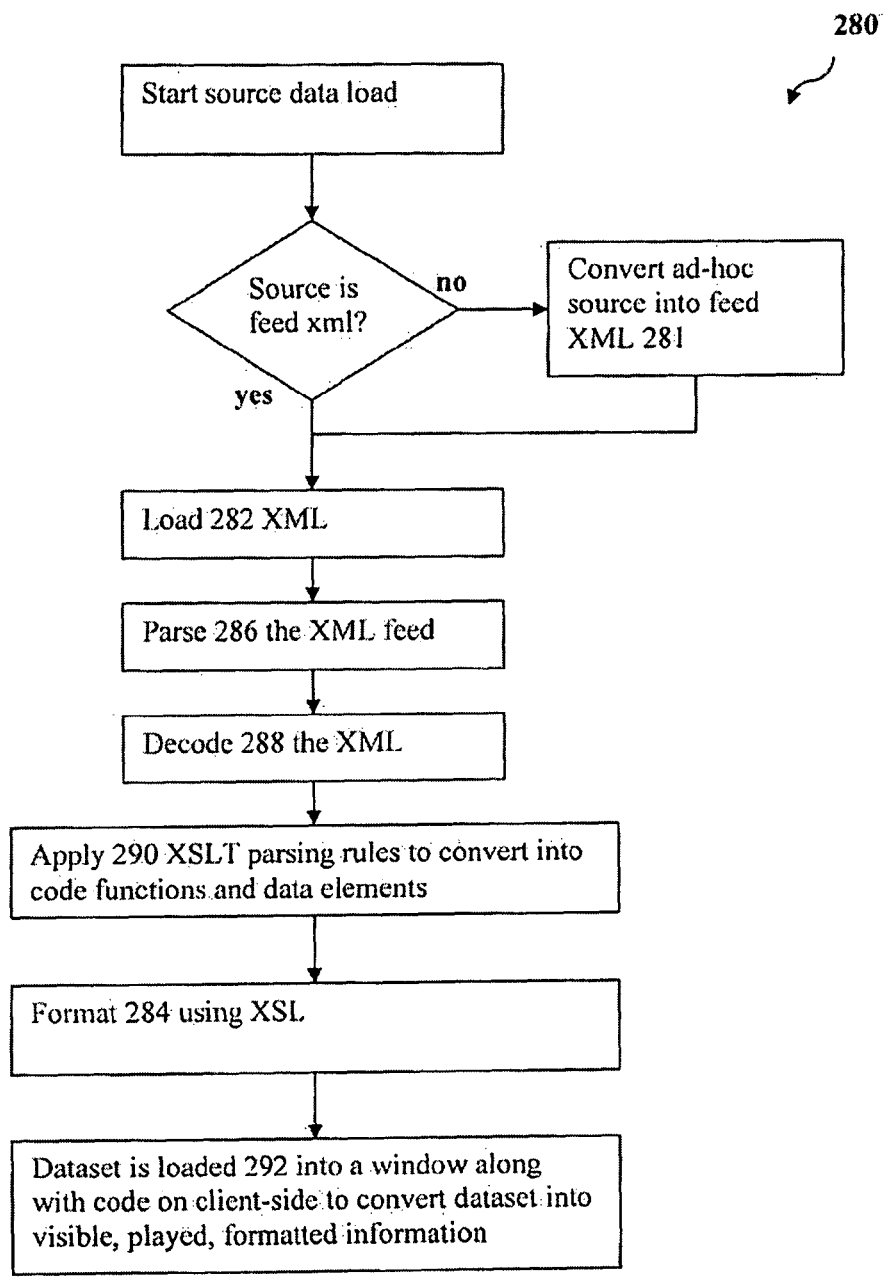
FIG. 14 is a flow chart depicting player operation.

Referring to FIG. 14, feeds currently are supplied as XML files in various formats such as RSS 2.0 and RSS 0.9. A transformation process 280 transforms these files into playable content for the player 10. The player 10 loads 282 the XML file and translates the XML file into a playable dataset, using XSLT. XLST is a language for transforming XML documents into other documents. XSLT is for use as part of XSL, which is a stylesheet language for XML. The document can be formatted 284 using XSL. That is, in addition to XSLT, XSL includes an XML vocabulary for specifying formatting. XSL specifies styling of an XML document by using XSLT to describe how the document is transformed into another document that uses the formatting vocabulary.

The transformation process 280 determines if the source data is a feed in XML. If not, then it is an ad-hoc source that needs to be converted 281 into a feed in XML. The XML is loaded 282, then the process parses 286 the XML feed, and decodes 288 its format. The transformation process 280 applies 290 XSLT parsing rules to convert the feed into code functions and data elements. The dataset 292 is loaded into a window along with code on the client-side to convert the dataset into visible, played, formatted information.

Figures 14A, 14B:
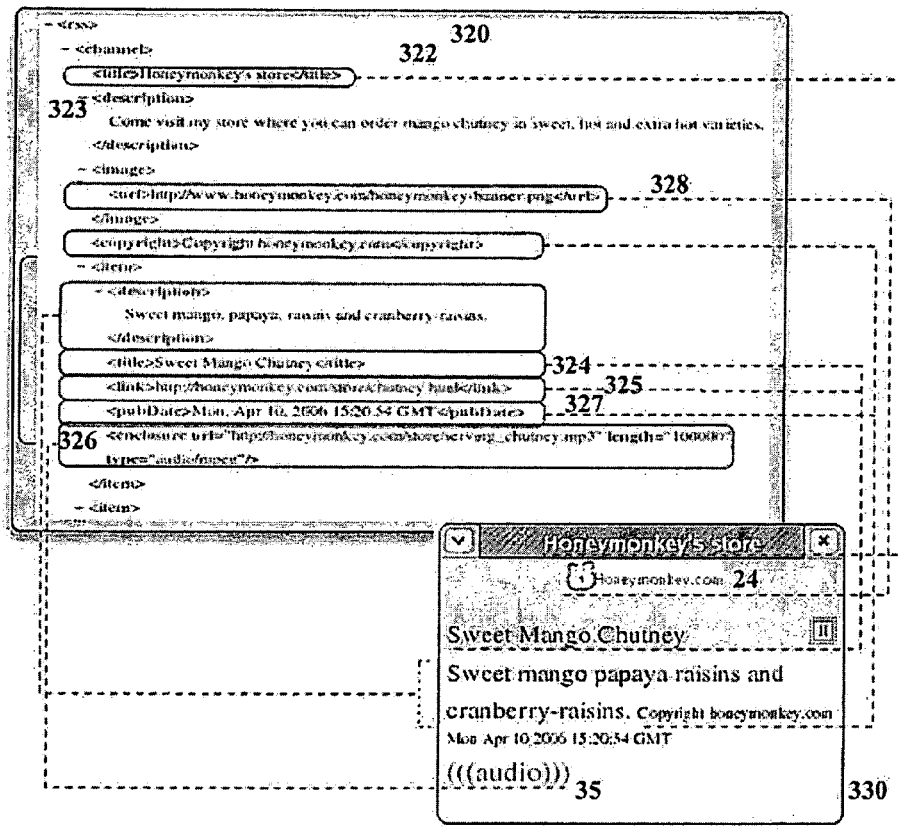
FIGS. 14A-B depict an XML source to player correspondence and an example of Extensible Stylesheet Language Transformations (XSLT transformations)

For example, as shown in FIG. 14A, the rss/image/url 328 is used as the banner image 14. The standard size of this image matches the banner layout, although some feed images do not. The rss/title 322 and rss/description 323 is used in the table of contents and the popup window title. The rss/item/title 324 and rss/item/link 325 is used in the title and its link for each item. The rss/item/description is used as the player content description, which may be augmented or superseded by other available tags, such as for an audio resource 326. The rss/item/author 327 and pubDate is used at the bottom of the contents to show the item's ownership. The rss/channel/item/enclosure 326 element can be used to produce a media link in a played item. If the type is audio, then an external audio player can be launched 35. If the type of video then an external video player can be launched, as examples.

Feed data, unlike a web page, is not usually formatted for user reading. The player often has to use a sensible layout to the data.

Referring to FIGS. 15A-H, the player can play content that is not in standard feed data. Images 342 and other media can be in a folder that is accessible as a URL in indexed format 340. The Player 346 reads the url's 340 web page HTML 347, and builds either a formal feed XML 320 from the HTML, or directly provides playable data for images.

In FIG. 15A, shown is an image folder index page 340 and image Player 341. Shown in FIG. 15A is a web folder 340—a URL that displays an index 340 of images. This URL html is parsed by the player 346 to produce a playable set of images 47, without the need for an actual "feed" (file). (In FIG. 15H, this facility can be used to upload images from cell phone cameras 353 or desktops, and have a dynamic "feed" of images played without the need for editing or crafting a feed file.)

Figure 15G:
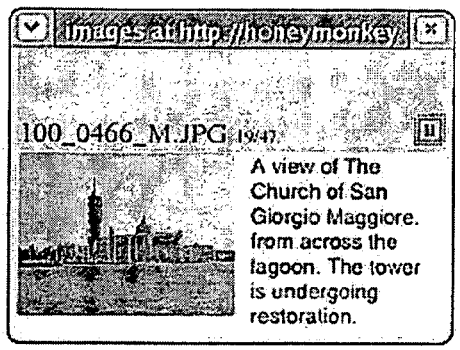

FIG. 15B shows standard indexed web folder html 347 generated from a web server. Images are used as an example here, but other media or documents can be used as well. Images can have supplemental files that to dynamically provide a played item. For example, an image file 342 (FIGS. 15C and 15D) has accompanying text 343 (or other document type) file that can be used to add descriptive text to the image shown. The text file could originate from various sources such as e-mail, text messaging, web form input, and so forth. Components of an item can be put together for display and interaction. The image file and a separate text (FIG. 15C) description file (FIG. 15D) are put together to form image and description item (FIG. 15G).

FIGS. 15E and 15F show an image 342 could have an accompanying xml 344 file that has tags for the item. These tags could specify parts of standard feed elements 345 or extended features such as those mentioned previously in the quick tools above. This additional information can provide a composite, dynamically provided dataset for the "item" when used (such as when played).

Enhancements to this dynamic playing include reading text 343, html, or xml 344 files for the webfolder or for each image (item) to provide information for each item. The webfolder is used as a dynamic ad-hoc database 349. Users post images 342 and other associated tagged or text 343 content into the folder, without any formatting or editing concerns. Players read and process this information into playable "feed-like" contents.

Figure 15H:
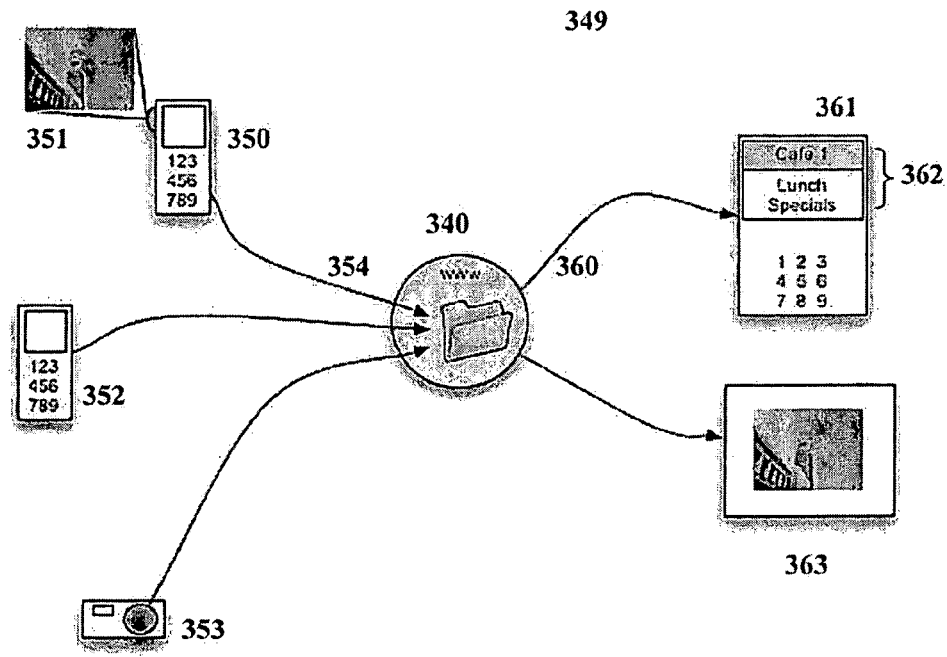

Referring to FIG. 15H, an example of posting 354 of cellphone 350 images 351 and messages 352 to the web, and the use of this content as a played feed 362. Cell-phone originated information cannot support much editing or control, so posting 354 the content to the web and viewing the content using the player 362, 363 simplifies sharing. Various creators of content (images, texts, audio, video, etc) can come from some sources, mobile or fixed, and post content to a shared server 340, while other users, with the described player, can receive 360 dynamically up to date contents built from this ad-hoc feed.

Player Engine

Figure 16:
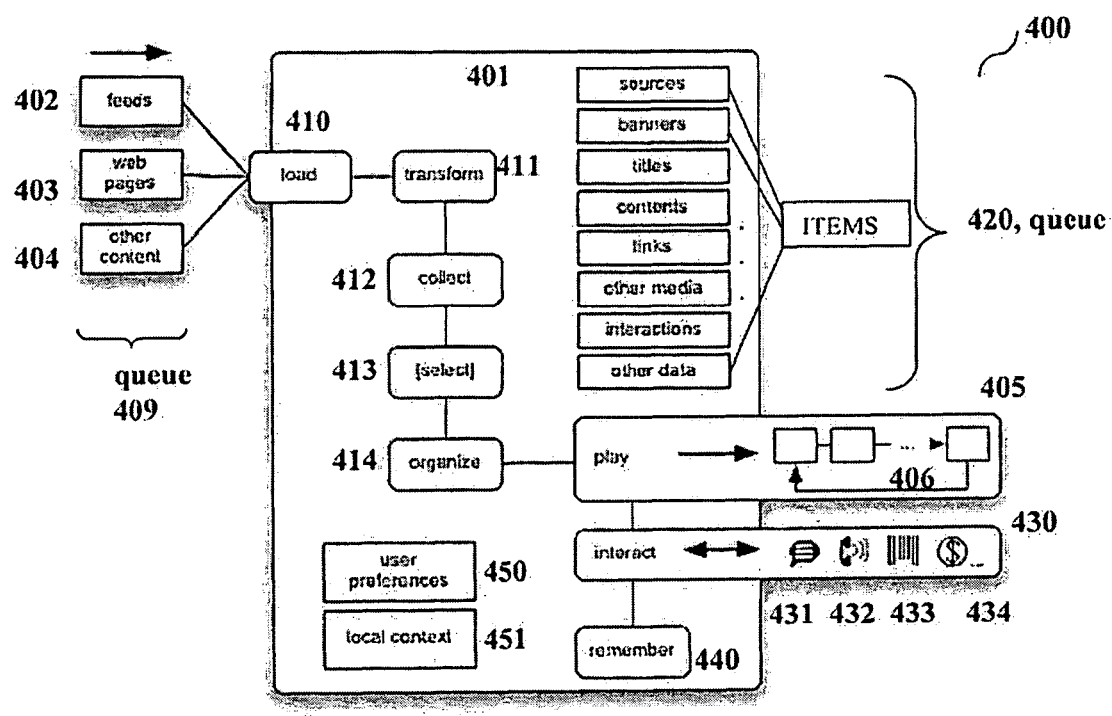
FIG. 16 is a block diagram of feed player "engine"

Referring to FIG. 16, features of a playable feed system 400 can be made into an "engine" 401, in software or hardware/software, and embedded into devices. The player engine accepts feeds 402, html pages 403, and other content 404 as input, and produces playable contents 405 with particular features and interactivity. The source information is loaded 410 and parsed (transformed) 411 into data and code components. Data are collected 412 and stored in a queue 420. The data includes information concerning the sources 420a, banners 420b, titles 420c, contents 420d, links 420e, media 420f, interactions 420g to provide for an item, and other data 420h. The queue 420 stores the content and related data for playback by the player 20 in an asynchronous manner, without the need for user interaction.

Queue 420 is shown organized by linked data structures of data types, e.g., sources 420a, banners 420b, titles 420c, contents 420d, links 420e, media 420f, interactions 420g to provide for an item, and other data 420h, with an item data type having links to the other data types stored in the queue. Other arrangements are possible. For instance, the queue can be organized by items in which each item's source, banner, title, content, links, media, permitted interactions provided for the item, as well as other data can be stored with and organized according to each item.

A subset is optionally selected 413, from the queue 420, based on criteria, either user defined or default criteria, e.g., number of players, number of feeds in each player, playback speed, etc. The content are organized 414 for playing 405. The player loops 406 through each item, either as individual or collective play-lists for playback in either one or multiple players. Each item can be interacted with 430, depending on the available and relevant interaction tools, such as commenting 431, or clipping 433. A history of played sources and interactions is maintained 440 for later recall.

Interactions can be made modular and loadable to support new interactions as they arise. Interaction tags (previously shown in FIG. 10G) are parsed and used by interaction modules. Display characteristics and transformation specifications can also be made modular to support new or custom attributes. User preferences 450 and local context 451 can be inputs into the engine via the device, to guide interactions and processing 410-414.

Site Playing

Figure 17:
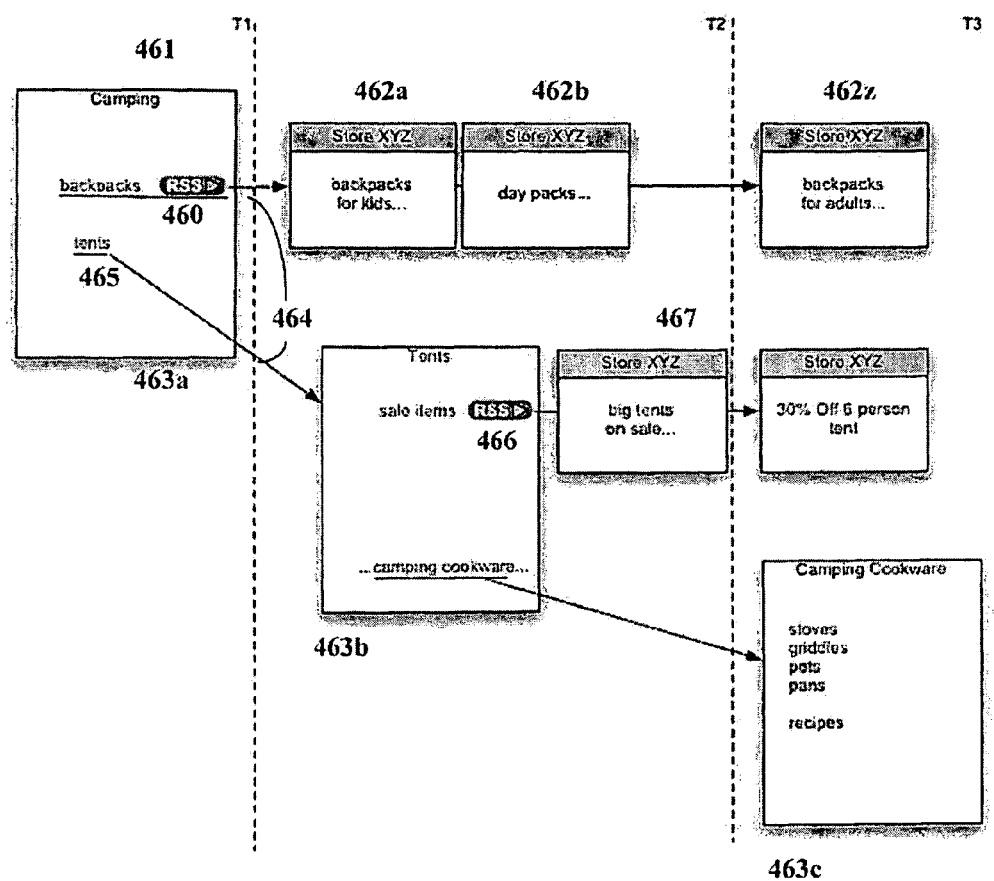
FIG. 17 is a diagrammatic web page browsing with embedded site-players

Referring to FIG. 17, the player can also be provided as a service to web sites 416. Such a service would allow websites to add links to their site to start feed players embedded within a page or as popups. Unlike the browser extension version 10 (FIG. 1), the site player would not require any special software installation on the client side, just a compatible browser.

"Site playing" allows websites to promote feed-based information directly to the user without the need for feed reader software. Use of the site player is interactive, e.g., the user can click 460 and get the played feed items 462. Browsing is changed from a sequential browsing of pages 463a,b,c, an asynchronous branching 464 and browsing of many pieces of information 462,463. This is advantageous to e-commerce sites in that users can receive site content (via players) even after the user has browsed away from a page or site. This increases the presence of the website for a user.

FIG. 17 shows a series of intervals, where the user is first on a page on "Camping" 463a. Selecting a feed link "backpacks" 460a launches a player 462a with information about backpacks. Products, helpful hints, and other items can be played in the launched player 462a. The user then clicks on the hyperlink from camping to "tents" 465. Even though the user has left the "camping" page 463a, the user still receives information about backpacks 462a plus the newly browsed page. The player 462a plus the newly loaded page 463b—backpacks and tents—provide complementary information to the user's browsing experience.

In this example, the user clicks further, to launch a feed on "sale items" 466, launching another player 467 showing sales. The user browses to "Camping Cookware" 463c. At the end of the example, the user now has 3 content streams in parallel: backpacks 462 player, sales 467 player, and camping cookware 463c page. The player information may or may not be coherent to each other—from the same site, it might be—however, each player is launched by the action of the user, and provides branched 464, asynchronous content to the user, who can close it at any time.

Computer kiosks provide information to people in places like public areas, transportation areas, stores, and offices. Feed playing can be used to provide kiosks with changing, dynamic content. Each kiosks in a place, such as a store, can be set to play particular feeds, based on where they are located and what people will see them. Since feed playing can be refreshed automatically, the contents can be kept new. Updating the feed source can cause all feed playing kiosks to reflect this change when they refresh. Interaction with feed items can be limited or altered for customer use.

Mobile Playing

Mobile devices (FIG. 7) are becoming more web-enabled. A player 80 within a mobile device 80 can provide sequentially played feed contents 84 and provide other features useful for mobile computing. Playing information on mobile devices opens up a multitude of possibilities for providing information to users via global (Internet) and local (wifi) connections 86. Playing content—products for sale 46, travel information 40, news 41, messages, etc.—is well suited for small devices where ability to control and pay attention to the device is a factor.

Playable Feed System

Figure 18:
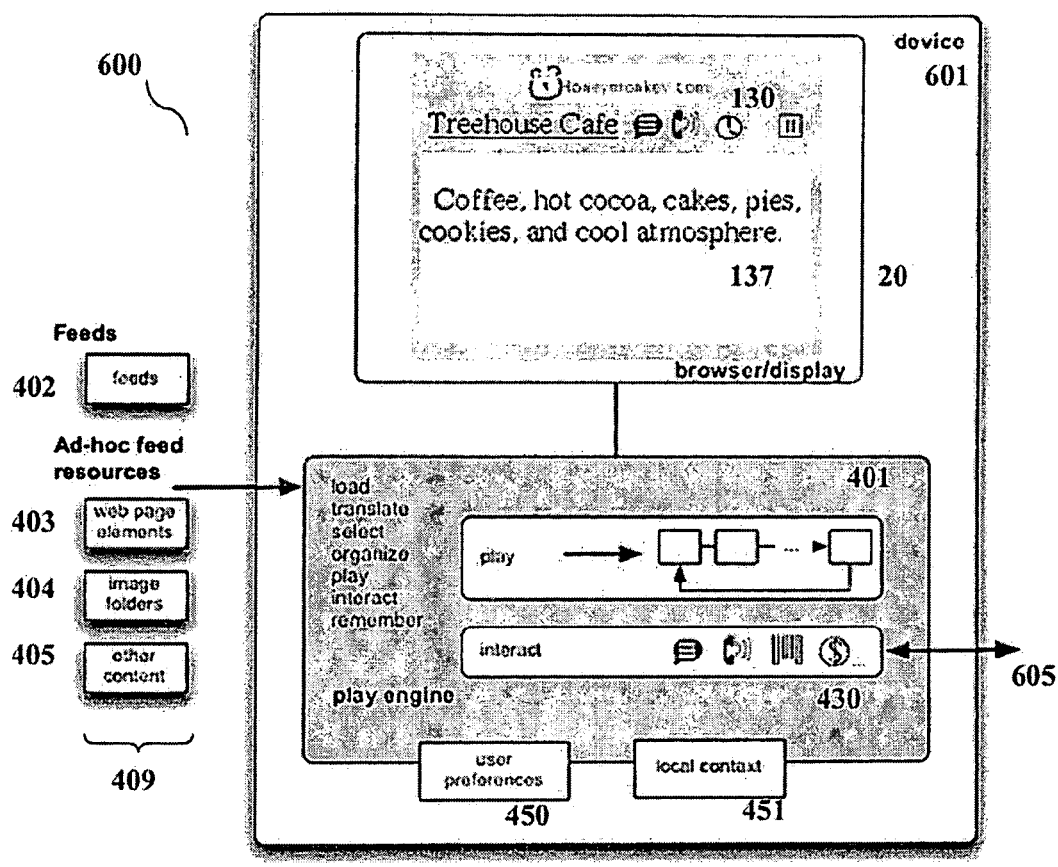
FIG. 18 is a diagram of play engine.

Referring to FIG. 18. shown is a system 600 including a device 601 with a play-engine 400, feed inputs. Feeds can either be formal feed data 402 or resources 403, 404, 405 used to build ad-hoc feeds. Interactive tools serve to bring interactivity 430 to individual items 409. The device has a browser type display 20 to show played items. The device can communicate with the external networked environment 605. Preferences 450 and contexts 451 of the device 601 and the play-engine 400 are connected.

The invention can be implemented in digital electronic circuitry, or in computer hardware, firmware, software, or in combinations thereof. Apparatus of the invention can be implemented in a computer program product tangibly embodied in a machine-readable storage device for execution by a programmable processor; and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

One such type of computer includes a programmable processing system suitable for implementing or performing the apparatus or methods of the invention. The system includes a processor, a random access memory (RAM), a program memory (for example, a writable read-only memory such as a flash ROM), a hard drive controller and an input/output (I/O) controller coupled by a processor bus. The system can be preprogrammed, in ROM, for example, or it can be programmed (and reprogrammed) by loading a program from another source (for example, from a floppy disk, a CD-ROM, or another computer).

An execution environment includes computers running an operating system and browsers. Other environments could of course be used.

A number of embodiments of the invention have been described. Nevertheless, it will be understood that various modifications may be made without departing from the spirit and scope of the invention. Accordingly, other embodiments are within the scope of the following claims.

What is claimed is:

1. A system comprising:
    a processor;
    a display; and
    a memory executing a computer program for dynamic playback of playable content, by a player application that has at least one of a stop control, a play control and a pause control, the computer program comprises instructions to cause the processor to:
        launch the player application;
        receive by the player application information content from user selected resources;
        determine formats of the information content from the user selected resources;
        determine which of the user selected resources are not in a specified mark-up language format;
        convert information content from the user selected resources that are not in the specified mark-up language format into the specified mark-up language format:
        parse and decode the converted information content into code functions and data elements to provide a dataset;
        load the dataset and the code functions into a player window to convert the dataset into produced visual playable content items;
        store by the player application the produced visual playable content items in a queue of visual playable content items;
        receive by the player application an assertion of at least one of the stop control, the play control and the pause control to play a user selection of the queued visual playable content items; and
        visually render in a player window user selected ones of the queued visual playable content items in a sequence for a period of time, with the sequence being regularly repeated, and with the period of time of the sequence, the selection of the queued visual playable content items, and a repetition rate of the sequence being based on user defined parameters.

2. The system of claim 1 wherein single or simultaneous, asynchronous players run on the system, each player having a play engine that determines the sequence to render the queued visual playable content items.

3. The system of claim 1 wherein the queued visual playable content items are played without a user interaction.

4. The system of claim 1 wherein the received information content is from resources that include one or more of feeds including syndication feeds, podcast feeds and web folders of images, text, and video data, and with at least some of the syndication feeds, podcast feeds and web folders of images, text, and video data.

5. The system of claim 1 further comprising instructions to:
    provide a set of interaction content producing tools to produce the visual playable content items, with the tools including at least one that executes the instructions to determine, convert, parse and decode to produce the visual playable content items, and at least one that collects the received information content into one playable set of visual playable content items.

6. The system of claim 5 wherein the tool that produces visual playable content items converts content in non-markup language formats to XML format.

7. The system of claim 1 wherein the instructions to convert, convert the information content into an XML mark-up language and the instructions to parse the converted content apply XLST style sheet parsing rules to convert the converted information content into the visual playable content items.

8. The system of claim 1 wherein the player application is integrated into a browser and loads feeds during browsing and the system is one of a desktop computer system, cell phone, personal digital assistant device, and/or a mobile device.

9. The system of claim 1 wherein the player is a site-tool playing products on an e-commerce site.

10. The system of claim 1 wherein the player application further comprises:
    a promo box that provides quick links to each of the visual playable content items, where a quick link in the promo box when selected causes the player application to load.

11. The system of claim 10 wherein sponsored messages, links, and advertisement are shown in the promo box to generate revenue and providing additional content.

12. The system of claim 10 wherein the user controls a type of information sent to the promo box, by at least one of topic, location, time, audience, and activity.

13. A computer implemented method executed on a device that includes a processor to execute a player application, the method comprises:
    receiving by the player application information content from one or more user selected resources;
    determining by the player application formats of the information content from the one or more user selected resources;
    determining by the player application which of the one or more user selected resources are not in a specified mark-up language format;
    converting by the player application content from the one or more user selected resources that are not in the specified mark-up language format into the specified mark-up language format:
    parsing and decoding by the player application the converted information content into code functions and data elements to provide a dataset;

loading by the player application the dataset and the code functions into a player window to convert the dataset into produced visual playable content items;

storing by the player application the produced visual playable content items in a queue of visual playable content items; and rendering by the player application user selected ones of the visual playable content items in a player window produced by the player application to cause the selected ones of the visual playable content items to be displayed in the player window in a sequence for a period of time and regularly repeated, with the sequence and with the period of time of the sequence, the selection of the queued visual playable content items, and a repetition rate of the sequence being based on user defined parameters.

14. The method of claim 13 wherein the one or more resources includes feeds, and the method further comprises:

converting by the player application the information content from the feeds to produce ad-hoc collections of the visual playable content items by:

collecting visual playable contend produced from the transformed information content and received, non-transformed information content; and storing the collected visual playable content items in a computer storage as an ad-hoc collection of the visual playable content items.

15. A computer program product tangibly embodied on a computer readable hardware storage device, the computer program product for playing content, by a player application that has at least one of a stop control, a play control and a pause control, the computer program product comprising instructions for causing a device to:

launch the player application:

receive information content from one or more user selected resources;

determine formats of the information content from the one or more user selected resources;

determine which of the one or more user selected resources are not in a specified mark-up language format;

convert information content from the one or more user selected resources that are not in the specified mark-up language format into the specified mark-up language format:

parse and decode the converted information content into code functions and data elements to provide a dataset;

load the dataset and the code functions into a player window to convert the dataset into produced visual playable content items;

store the produced visual playable content items in a queue of visual playable content items in a computer storage;

receive an assertion of at least one of the stop control, the play control and the pause control to play a user selection of the queued visual playable content items;

retrieve the selection of visual playable content items, with selection being according to a user-specified criteria for playback of the selected visual playable content items; and render the selection of visual playable content items in a player window produced by the launched player application, with the selection of visual playable content items displayed in a sequence for a period of time and to regularly repeat the sequence, and with the period of time of the sequence, the selection of the queued visual playable content items, and a repetition rate of the sequence being based on user defined parameters.

16. The computer program product of claim 15, further comprising instructions to:

provide a set of interaction content producing tools to produce the visual playable content items, with the tools including at least one that executes the instructions to determine, convert, parse and decode to produce the user selected visual playable content items, and at least one that collects received information content into one playable set of visual playable content items.

17. The computer program product of claim 15 further comprising instructions to cause the processor to:

produce visual playable content items by parsing tags, patterns, text, and identifiers from the one or more user selected resources.

18. The computer program product of claim 15, further comprising instructions to:

convert the information content from the one or more user selected resources to produce an ad-hoc collection of the visual playable content items by instructions to:

collect visual playable content items produced from the converted information content and received, non-converted information content; and store the collected visual playable content items in the computer storage as the ad-hoc collection of the visual playable content items.

19. The computer program product of claim 15, wherein the received information content is from the one or more user selected resources that include one or more of feeds including syndication feeds, podcast feeds and web folders of images, text, and video data.

20. The computer program product of claim 16, wherein the tool that produces visual playable content items converts content in non-markup language formats to XML format.

21. A system comprising:

a processor;

a display; and a memory executing a computer program for dynamic playback of playable content, by a player application that has at least one of a stop control, a play control and a pause control, the computer program comprises instructions to cause the processor to:

receive by the player application information content from one or more user selected resources;

determine formats of the information content from the user selected resources;

determine which of the one or more user selected resources are not in a specified mark-up language format;

convert the information content from the one or more user selected resources that are not in the specified mark-up language format into the specified mark-up language format:

parse and decode the converted information content into code functions and data elements to provide a dataset;

load the dataset and the code functions into a player window to convert the dataset into produced visual playable content items;

store by the player application the produced visual playable content items in a queue of visual playable content items;

retrieved by the player application visual playable content items stored on the system in the queue of visual playable content items; and render by the player application in a player window an ad-hoc collection of the visual playable content items, the ad-hoc collection based at least in part on user preferences.

22. The system of claim 21, wherein the ad hoc collection is rendered in a sequence and for a period of time at a repetition rate that are based on user defined parameters.

23. The system of claim 21, further comprising instructions to:
produce the ad-hoc collection of the visual playable content items by instructions to:
collect visual playable content produced from the converted information content and received, non-converted information content; and
store the collected visual playable content items in computer storage as the ad-hoc collection of the visual playable content items.

24. The system of claim 21 further comprising instructions to:
provide a set of interaction content producing tools to produce the visual playable content items, with the tools including at least one that executes the instructions to determine, convert, parse and decode to produce the user selected visual playable content items, and at least one that collects the received information content into the ad-hoc collection of visual playable content items.

* * * * *